(12) United States Patent
Ganguly et al.

(10) Patent No.: US 8,816,019 B2
(45) Date of Patent: Aug. 26, 2014

(54) THERMOPLASTIC COMPOSITIONS FOR LASER DIRECT STRUCTURING AND METHODS FOR THE MANUFACTURE AND USE THEREOF

(71) Applicant: SABIC Innovative Plastics IP B.V., Bergen op Zoom (NL)

(72) Inventors: Anirban Ganguly, Bangalore (IN); Susanta Mitra, Bangalore (IN); Wu Tong, Shanghai (CN); Liu Shuiping, Shanghai (CN)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 13/735,748

(22) Filed: Jan. 7, 2013

(65) Prior Publication Data

US 2014/0194561 A1 Jul. 10, 2014

(51) Int. Cl.
- *C08F 283/00* (2006.01)
- *C08F 283/02* (2006.01)
- *B01J 19/12* (2006.01)

(52) U.S. Cl.
USPC ........... 525/446; 525/474; 525/464; 524/262; 524/407; 204/157.41

(58) Field of Classification Search
None
See application file for complete search history.

(56) References Cited

U.S. PATENT DOCUMENTS

| | | | |
|---|---|---|---|
| 4,159,414 A | 6/1979 | Suh et al. | |
| 4,387,176 A | 6/1983 | Frye | |
| 4,536,529 A | 8/1985 | Frye | |
| 4,746,701 A | 5/1988 | Kress et al. | |
| 4,841,099 A | 6/1989 | Epstein et al. | |
| 6,072,011 A * | 6/2000 | Hoover | 525/464 |
| 7,060,421 B2 * | 6/2006 | Naundorf et al. | 430/324 |
| 8,017,679 B2 | 9/2011 | Qiu et al. | |
| 8,017,697 B2 | 9/2011 | Carrillo | |
| 2006/0014919 A9 * | 1/2006 | Venderbosch et al. | 528/196 |
| 2007/0048527 A1 * | 3/2007 | Agarwal et al. | 428/412 |
| 2007/0100088 A1 * | 5/2007 | Gallucci et al. | 525/446 |
| 2009/0292048 A1 * | 11/2009 | Li et al. | 524/115 |
| 2009/0292051 A1 | 11/2009 | Li et al. | |
| 2010/0080972 A1 * | 4/2010 | Pai-Paranjape et al. | 428/220 |
| 2011/0251326 A1 * | 10/2011 | Van Hartingsveldt et al. | 524/430 |
| 2012/0276390 A1 * | 11/2012 | Ji et al. | 428/412 |
| 2012/0329922 A1 * | 12/2012 | Schrauwen | 524/165 |
| 2012/0329933 A1 * | 12/2012 | Schrauwen | 524/407 |
| 2013/0168133 A1 * | 7/2013 | Schrauwen | 174/250 |

OTHER PUBLICATIONS

"Laser Direct Structuring (LDS) Technology." http://www.molex. com/molex/products/family?key=laser_direct structuring_lds_ technology&channel=products&chanName=family &pageTitle=Introduction. Visited Jan. 1, 2012.

Huske M. "Laser Supported Activation and Additive Mettalization of Thermoplastics for 3D-MIDs"—Proceedings of the 3rd LANE 2001, Aug. 28-31, 2001, Germany.

(Continued)

*Primary Examiner* — Robert S Loewe
(74) *Attorney, Agent, or Firm* — Baker Hostetler LLP

(57) ABSTRACT

The present disclosure relates to thermoplastic compositions. The disclosed compositions comprise a polycarbonate polymer, a polysiloxane-polycarbonate copolymer, a laser direct structuring additive, and a siloxane additive. Also disclosed are methods for making the disclosed thermoplastic compositions and articles of manufacture comprising the disclosed thermoplastic compositions.

33 Claims, 18 Drawing Sheets

(56) References Cited

OTHER PUBLICATIONS

Naundorf G, et al. "A fundamentally new mechanism for additive metallization of polymeric substrates in ultra-fine line technology illustrated for 3D-MIDs." Galvanotechnik (200) 9(91): 2449-2451.

Shafeej GA. "Laser activation and metallization of insulators." Quantum Electronics (1997) 27(12): 1104-1110.

Technical brochure, "3-Dimensional circuits, laser direct structuring technology (LPKF-LDS™) for molded interconnect devices." LPKF Laser & Electronics AG (2009).

Schlesinger M. "Electroless deposition of nickel." Modern Electroplating, Fifth Edition. John Wiley and Sons (2010).

Gian PW, et al. "High apsect pattern formation by integration of micro inkjetting and electroless plating." DTIP of MEMS & MOEMS. Apr. 9-11, 2003.

Zhang Y, et al. "Laser induced selective activation for subsequent autocatalytic electroless plating." Doctor of Philosophy Dissertation. Technical University of Denmark, Department of Mechanical Engineering, Oct. 2010.

Mallory GO and Hajdu JB. "Electroless plating—fundamentals and applications." William Andrew Publishing/Noyes (1990), pp. 331-399.

* cited by examiner

THERMOPLASTIC COMPOSITIONS FOR LASER DIRECT STRUCTURING AND METHODS FOR THE MANUFACTURE AND USE THEREOF

BACKGROUND OF THE INVENTION

Electrical components can be provided as molded injection devices (MID) with desired printed conductors. In contrast to conventional circuit boards made of fiberglass-reinforced plastic or the like, MID components manufactured in this way are three-dimensional (3D) molded parts having an integrated printed conductor layout and possibly further electronic or electromechanical components. The use of MID components of this type, even if the components have only printed conductors and are used to replace conventional wiring inside an electrical or electronic device, saves space, allowing the relevant device to be made smaller. It also lowers the manufacturing costs by reducing the number of assembly and contacting steps. These MID devices have great utility in cell phones, PDAs and notebook applications.

Stamp metal, flexible printed circuit board (FPCB) mounted and two-shot molding methods are three existing technologies to make an MID. However, stamping and FPCB mounted process have limitations in the pattern geometry, and the tooling is expensive. Also, altering of a RF pattern causes high-priced and time-consuming modifications in tooling. 2-shot-molding (two-component injection molding) processes have also been used to produce 3D-MIDs with real three-dimensional structures. For example, an antenna can be formed by subsequent chemical corrosion, chemical surface activation and selective metal coating. This method involves relatively high initial costs and is only economically viable for large production numbers. 2-shot-molding is also not regarded as an environmentally friendly process. All of these three methods are tool-based technologies, which have limited flexibility, long development cycles, difficult prototype, expensive design changes, and limited ability to produce miniaturization. Accordingly, it is becoming increasingly popular to form MIDs using a laser direct structuring (LDS) process. In an LDS process a computer-controlled laser beam travels over the MID to activate the plastic surface at locations where the conductive path is to be situated.

Laser-supported or directed structuring process (LDS) for 3D MIDs simplifies the manufacturing process. Simplifying the miniaturization process, the laser, with possible resolutions of less than 0.1 mm, may produce fine structures and remove material from plastic surfaces with precision and selectivity. For example, the LDS process allows for antenna structures to be directly and cost effectively integrated into a cell phone housing. Further, the LDS process allows for sophisticated mechatronic systems that integrate mechanical and electrical properties for automotive and medical applications. With a laser direct structuring process, it is also possible to obtain small conductive path widths (such as 150 microns or less). In addition, the spacing between the conductive paths can also be small. As a result, MIDs formed from this process can save space and weight in end-use applications. Another advantage of laser direct structuring is its flexibility. If the design of the circuit is to be changed, it is simply a matter of reprogramming the computer that controls the laser.

In a conventional LDS process, a thermoplastic composition can be doped with a metal containing LDS additive such that it can be activated by a laser. The laser beam can then be used to activate the LDS additive forming a micro-rough track on the surface. The metal particles from the LDS additive present on the surface of the micro-rough track can in turn form nuclei for the subsequent metallization. However, due to different chemical plating solutions and conditions used, the plating performance of conventional LDS materials can vary in ways such as plating rate and adhesion of plating layers. In addition, some LDS fillers have a surface pH that may be detrimental to the polymer matrix during processing, resulting in degradation of the polymers. This polymer matrix degradation leads to, for example, decreased ductility for the final composition. The changed ductility, along with and other property changes, may result in substantial, and potentially undesirable, changes in the material's overall properties.

Accordingly, it would be beneficial to provide a LDS blended thermoplastic composition (or LDS compound) having good plating performance while maintaining good mechanical performance. It would also be beneficial to provide a LDS blended thermoplastic composition that is capable of being used in various applications due to the ability of the composition to provide good mechanical performance. It would also be beneficial to provide a thermoplastic composition that is capable of being used in a laser direct structuring process. Accordingly, there remains a need for thermoplastic compositions that prevent or reduce polymer matrix degradation during processing. This and other needs are satisfied by the various aspects of the present disclosure.

SUMMARY OF THE INVENTION

In accordance with the purpose of the invention, as embodied and broadly described herein, the invention, in one aspect, relates to a thermoplastic composition comprising:
   a. a polycarbonate polymer;
   b. a polysiloxane-polycarbonate copolymer;
   c. a laser direct structuring additive; and
   d. a siloxane additive;
wherein a molded article having a thickness of 3.2 mm formed from the composition exhibits a notched izod impact energy that is at least 10% greater than that exhibited by a molded article formed from an identical reference composition in the absence of the siloxane additive.

Also disclosed is a method for making a thermoplastic composition; comprising forming a blend composition comprising:
   a. a polycarbonate polymer;
   b. a polysiloxane-polycarbonate copolymer;
   c. a laser direct structuring additive; and
   d. a siloxane additive;
wherein a molded article having a thickness of 3.2 mm formed from the blend composition exhibits a notched izod impact energy that is at least 10% greater than that exhibited by a molded article formed from an identical reference blend composition in the absence of the siloxane additive.

Also disclosed are articles of manufacture comprising
   a. a polycarbonate polymer;
   b. a polysiloxane-polycarbonate copolymer;
   c. a laser direct structuring additive; and
   d. a siloxane additive;
wherein a molded article having a thickness of 3.2 mm formed from the blend composition exhibits a notched izod impact energy that is at least 10% greater than that exhibited by a molded article formed from an identical reference blend composition in the absence of the siloxane additive.

While aspects of the present invention can be described and claimed in a particular statutory class, such as the system statutory class, this is for convenience only and one of skill in the art will understand that each aspect of the present invention can be described and claimed in any statutory class.

Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Other advantages will be set forth in part in the description which follows or may be learned by practice. The advantages will be realized and attained by means of the elements and combinations particularly pointed in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate exemplary aspects and together with the description, serve to explain the principles of the compositions, methods and systems disclosed herein.

FIG. 1 includes (100) a motor, (120) a gear box, (130) a vibrator feeder, (140) an extruder, (150) a die hard, (160) a vacuum pump, (170) strands, (180) a water bath, and (190) a pelletizer.

FIG. 2 shows the addition of polymers, LDS filler, and additives at point A. The temperature at point B is 240° C., at point C is 260° C., and at point D is 280° C.

FIG. 7A shows Cu—Cr spinel lot 1 untreated, FIG. 7B shows Cu—Cr spinel lot 2 untreated, and FIG. 7C shows Cu—Cr spinel surface treated with SOI.

DETAILED DESCRIPTION OF THE INVENTION

Figure 1:
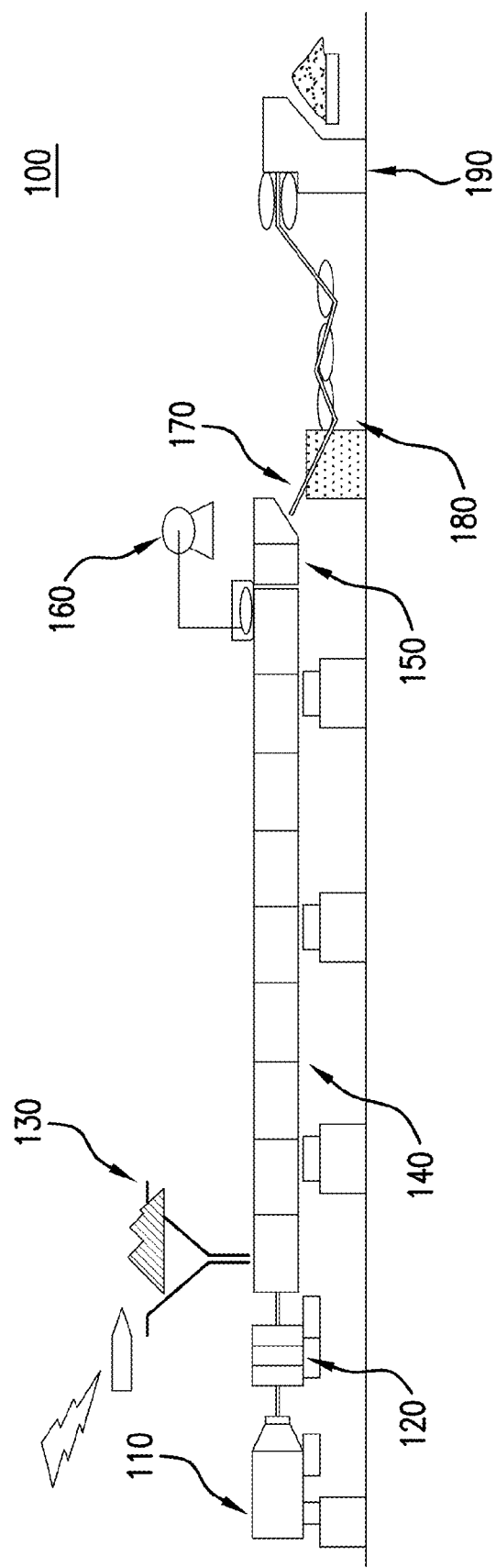
FIG. 1 shows a representative schematic diagram of compounding set-up.

The present invention can be understood more readily by reference to the following detailed description, examples, drawings, and claims, and their previous and following description. However, before the present compositions, articles, devices, systems, and/or methods are disclosed and described, it is to be understood that this invention is not limited to the specific compositions, articles, devices, systems, and/or methods disclosed unless otherwise specified, as such can, of course, vary. It is also to be understood that the terminology used herein is for the purpose of describing particular aspects only and is not intended to be limiting.

The following description of the invention is also provided as an enabling teaching of the invention in its best, currently known aspect. To this end, those of ordinary skill in the relevant art will recognize and appreciate that changes and modifications can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are thus also a part of the present invention. Thus, the following description is provided as illustrative of the principles of the present invention and not in limitation thereof.

Various combinations of elements of this disclosure are encompassed by this invention, e.g. combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

It is also to be understood that the terminology used herein is for the purpose of describing particular aspects only and is not intended to be limiting. As used in the specification and in the claims, the term "comprising" may include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more such polycarbonates. Furthermore, for example, reference to a filler includes mixtures of two or more such fillers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event, condition, component, or circumstance may or may not occur, and that the description includes instances where said event or circumstance occurs and instances where it does not.

As used herein, the term or phrase "effective," "effective amount," or "conditions effective to" refers to such amount or condition that is capable of performing the function or property for which an effective amount is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

Disclosed are component materials to be used to prepare disclosed compositions of the invention as well as the compositions themselves to be used within methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

Compounds disclosed herein are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula AOA$^1$, where A and A$^1$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "sulfo-oxo group" as used herein is represented by the formulas —S(O)$_2$R, —OS(O)$_2$R, or, —OS(O)$_2$OR, where R can be hydrogen, an alkyl, alkenyl, alkynyl, aryl, aralkyl, cycloalkyl, halogenated alkyl, or heterocycloalkyl group described above.

As used herein, the terms "number average molecular weight" or "Mn" can be used interchangeably, and refer to the statistical average molecular weight of all the polymer chains in the sample and is defined by the formula:

$$Mn = \frac{\Sigma N_i M_i}{\Sigma N_i},$$

where $M_i$ is the molecular weight of a chain and $N_i$ is the number of chains of that molecular weight. Mn can be determined for polymers, such as polycarbonate polymers or polycarbonate-PMMA copolymers, by methods well known to a person having ordinary skill in the art. It is to be understood that as used herein, Mn is measured gel permeation chromatography and as calibrated with polycarbonate standards. For example, gel permeation chromatography can be carried out using a crosslinked styrene-divinyl benzene column, at a sample concentration of 1 milligram per milliliter with appropriate mobile phase solvents.

As used herein, the terms "weight average molecular weight" or "Mw" can be used interchangeably, and are defined by the formula:

$$Mw = \frac{\Sigma N_i M_i^2}{\Sigma N_i M_i},$$

where $M_i$ is the molecular weight of a chain and $N_i$ is the number of chains of that molecular weight. Compared to Mn, Mw takes into account the molecular weight of a given chain in determining contributions to the molecular weight average. Thus, the greater the molecular weight of a given chain, the more the chain contributes to the Mw. It is to be understood that as used herein, Mw is measured gel permeation chromatography. In some cases, Mw is measured gel permeation chromatography and calibrated with polycarbonate standards. Gel permeation chromatography can be carried out using a crosslinked styrene-divinyl benzene column, at a sample concentration of about 1 milligram per milliliter with appropriate mobile phase solvents.

As used herein, the terms "polydispersity index" or "PDI" can be used interchangeably, and are defined by the formula:

$$PDI = \frac{Mw}{Mn}.$$

The PDI has a value equal to or greater than 1, but as the polymer chains approach uniform chain length, the PDI approaches unity.

The terms "polycarbonate" or "polycarbonates" as used herein includes copolycarbonates, homopolycarbonates and (co)polyester carbonates.

The terms "residues" and "structural units", used in reference to the constituents of the polymers, are synonymous throughout the specification.

Each of the component materials disclosed herein are either commercially available and/or the methods for the production thereof are known to those of ordinary skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

I. Thermoplastic Compositions

As summarized above, the disclosure provides improved thermoplastic compositions that are particularly useful in connection with laser direct structuring (LDS) technology. For example, as described in greater detail below, aspects of the disclosure provide thermoplastic compositions that are capable of being used in a laser direct structuring (LDS) process and that provide enhanced plating performance while exhibiting relatively good mechanical properties. To that end, the disclosed thermoplastic compositions generally comprise a blend of a polycarbonate polymer component; a polysiloxane-polycarbonate copolymer component; a laser direct structuring additive; and a siloxane additive. The disclosed thermoplastic compositions can further optionally comprise one or more additional additives.

The disclosed thermoplastic compositions disclosed herein provide robust plating performance while maintaining good mechanical properties (e.g., Izod impact strength higher than about 400 J/m). Evaluation of the mechanical properties can be performed through various tests, such as Izod test, Charpy test, Gardner test, etc., according to several standards (e.g., ASTM D256). Robustness of plating performance can be measured via a performance ranking, or plating ranking, ranging from top performance (e.g., "best") to bottom performance. The ranking can be partitioned in various levels. In one aspect, a plating ranking can have a level of "10" for top performance and a level of "0" for bottom performance.

The disclosed thermoplastic compositions can exhibit, for example, improved mechanical, thermal, and/or morphological properties. Further, for example, the thermoplastic compositions may show improved ductility and improved impact strength. Even further for example, the thermoplastic compositions may show improved ductility and improved impact strength without adversely affecting other mechanical and thermal properties.

According to aspects of the disclosure, the disclosed thermoplastic compositions can exhibit improved mechanical properties as evidenced by an increased Izod impact energy. For example, a molded article formed from a disclosed thermoplastic composition exhibits a notched izod impact energy that is at least 10% greater than that exhibited by a molded article formed from an identical reference composition in the absence of the siloxane additive. The reference composition has the same thermoplastic composition but does not comprise the siloxane additive. In another aspect, a molded article formed from the thermoplastic composition exhibits a notched izod impact energy that is at least 100% greater than that exhibited by a molded article formed from an identical reference composition in the absence of the siloxane additive. In still a further aspect, a molded article formed from the thermoplastic composition exhibits a notched izod impact energy that is at least 500% greater than that exhibited by a molded article formed from an identical reference composition in the absence of the siloxane additive.

According to aspects of the disclosure, a molded article formed from the disclosed thermoplastic compositions can exhibit a notched izod impact energy at 23° C. of at least 500 J/m. In further aspects, a molded article formed from a disclosed thermoplastic composition can exhibit a notched izod impact energy at 23° C. in the range of from 400 J/m to 600 J/m, including exemplary impact energy values of 410 J/m, 420 J/m, 430 J/m, 440 J/m, 450 J/m, 460 J/m, 470 J/m, 480 J/m, 490 J/m, 500 J/m, 510 J/m, 520 J/m, 530 J/m, 540 J/m, 550 J/m, 560 J/m, 570 J/m, 580 J/m, and 590 J/m. In still further aspects, a molded article formed from a disclosed thermoplastic composition can exhibit a notched izod impact energy at 23° C. in any range derived from any two values set forth above. For example, a molded article formed from a thermoplastic composition can exhibit a notched izod impact energy at 23° C. in the range of from 500 J/m to 550 J/m.

In further aspects, a molded article formed from a disclosed thermoplastic composition can exhibit a notched izod impact energy at −23° C. in the range of from 250 J/m to 500 J/m, including exemplary impact energy values of 260 J/m, 270 J/m, 280 J/m, 290 J/m, 300 J/m, 310 J/m, 320 J/m, 330 J/m, 340 J/m, 350 J/m, 360 J/m, 370 J/m, 380 J/m, 390 J/m, 400 J/m, 410 J/m, 420 J/m, 430 J/m, 440 J/m, 450 J/m, 460 J/m, 470 J/m, 480 J/m, and 490 J/m. In still further aspects, a molded article formed from a disclosed thermoplastic composition can exhibit a notched izod impact energy at −23° C. in any range derived from any two values set forth above. For example, a molded article formed from a thermoplastic composition can exhibit a notched izod impact energy at −23° C. in the range of from 300 J/m to 400 J/m.

In an exemplary aspect, a molded article formed from a disclosed thermoplastic composition exhibits a notched izod impact energy at 23° C. of at least 500 J/m and a notched izod impact energy at −23° C. of at least 300 J/m.

In still further aspects, molded articles formed from the disclosed thermoplastic compositions exhibit improved ductility. For example, a molded article formed from a disclosed thermoplastic composition can exhibit a % ductility of 100% as measured according to ASTM D256-2010. In further aspects, a molded article formed from a disclosed thermoplastic composition can exhibit a % ductility of at least 90% as measured according to ASTM D256-2010. In still a further aspect, a molded article formed from a disclosed thermoplastic composition can exhibit a % ductility of at least 80% as measured according to ASTM D256-2010.

According to aspects of the disclosure, molded articles formed from the disclosed thermoplastic compositions can exhibit improved tensile modulus. For example, the tensile modulus can be in the range of from 1.0 GPa to 3.0 GPa, including exemplary values of 1.1 GPa, 1.2 GPa, 1.3 GPa, 1.4 GPa, 1.5 GPa, 1.6 GPa, 1.7 GPa, 1.8 GPa, 1.9 GPa, 2.0 GPa, 2.1 GPa, 2.2 GPa, 2.3 GPa, 2.4 GPa, 2.5 GPa, 2.6 GPa, 2.7 GPa, 2.8 GPa, and 2.9 GPa. In another aspect, the tensile modulus can be in any range derived from any two of the above tensile modulus values. For example, the tensile modulus can be in the range of from 2.0 GPa to 3.0 GPa. In still a further aspect, the tensile modulus can be in the range of from 2.1 GPa to 2.5 GPa.

According to aspects of the disclosure, a molded article formed from the disclosed thermoplastic compositions can exhibit improved tensile strength. For example, the tensile strength can be in the range of from 30 MPa to 50 MPa, including exemplary tensile strengths of 31 MPa, 32 MPa, 33 MPa, 34 MPa, 35 MPa, 36 MPa, 37 MPa, 38 MPa, 39 MPa, 40 MPa, 41 MPa, 42 MPa, 43 MPa, 44 MPa, 45 MPa, 46 MPa, 47 MPa, 48 MPa, and 49 MPa. In still a further aspect, the tensile strength can be within any range of values derived from the above tensile strength values. For example, the tensile strength can be in the range of from 40 MPa to 50 MPa. In a further aspect, the tensile strength can be in the range of from 40 MPa to 45 MPa.

In still further aspects, molded articles formed from the disclosed thermoplastic compositions can exhibit desirable values of percent elongation at break. For example, according to aspects, a molded article formed from the disclosed thermoplastic compositions can exhibit an elongation at break in the range of from 5% to 30%, including exemplary values of 6%, 7%, 8%, 9%, 10%, 11%, 12%, 13%, 14%, 15%, 16%, 17%, 18%, 19%, 20%, 21% 22%, 23%, 24%, 25%, 26%, 27%, 28%, and 29%. In still further aspects, the elongation at break percentage can be in a range derived from any two of the above listed exemplary elongation at break percentages. For example, the elongation at break can be in the range of from 10% to 30%. In a further aspect, the elongation at break can be in the range of from 10% to 20%.

According to aspects of the disclosure, molded articles formed from the disclosed thermoplastic compositions can exhibit improved flexural modulus. For example, the flexural modulus can be in the range of from 1.0 GPa to 3.0 GPa, including exemplary values of 1.1 GPa, 1.2 GPa, 1.3 GPa, 1.4 GPa, 1.5 GPa, 1.6 GPa, 1.7 GPa, 1.8 GPa, 1.9 GPa, 2.0 GPa, 2.1 GPa, 2.2 GPa, 2.3 GPa, 2.4 GPa, 2.5 GPa, 2.6 GPa, 2.7 GPa, 2.8 GPa, and 2.9 GPa. In another aspect, the flexural modulus can be in any range derived from any two of the above flexural modulus values. For example, the flexural modulus can be in the range of from 2.0 GPa to 3.0 GPa. In still a further aspect, the flexural modulus can be in the range of from 2.1 GPa to 2.5 GPa.

According to aspects of the disclosure, a molded article formed from the disclosed thermoplastic compositions can exhibit improved flexural strength. For example, the flexural strength can be in the range of from 60 MPa to 90 MPa, including exemplary flexural strengths of 61 MPa, 62 MPa, 63 MPa, 64 MPa, 65 MPa, 66 MPa, 67 MPa, 68 MPa, 69 MPa, 70 MPa, 71 MPa, 72 MPa, 73 MPa, 74 MPa, 75 MPa, 76 MPa, 77 MPa, 78 MPa, and 79 MPa, 80 MPa, 81 MPa, 82 MPa, 83 MPa, 84 MPa, 85 MPa, 86 MPa, 87 MPa, 88 MPa, and 89 MPa. In still a further aspect, the flexural strength can be within any range of values derived from the above flexural strength values. For example, the tensile strength can be in the range of from 70 MPa to 90 MPa. In another aspect, the flexural strength can be in the range of from 75 MPa to 90 MPa. In still a further aspect, the flexural strength can be in the range of from 79 MPa to 90 MPa.

In still further aspects, molded articles formed from the disclosed thermoplastic compositions can exhibit desirable heat deflection temperatures (HDT). For example, a molded article formed from a disclosed thermoplastic composition can exhibit a heat deflection temperature in the range of from 90 to 150° C. In another aspect, a molded article formed from a disclosed thermoplastic composition can exhibit a heat deflection temperature in the range of from 100 to 130° C. In another aspect, a molded article formed from a disclosed thermoplastic composition can exhibit a heat deflection temperature in the range of from 110 to 120° C. In still further exemplary aspects, a molded article formed from a disclosed thermoplastic composition can exhibit a heat deflection temperature of 112° C., 113° C., 115° C., or 117° C.

A. Polycarbonate Polymer Component

The term polycarbonate as used herein is not intended to refer to only a specific polycarbonate or group of polycarbonates, but rather refers to the any one of the class of compounds containing a repeating chain of carbonate groups. In one aspect, a polycarbonate material can include any one or more of those polycarbonate materials disclosed and described in U.S. Pat. No. 7,786,246, which is hereby incorporated by reference in its entirety for the specific purpose of disclosing various polycarbonate compositions and methods for manufacture of same.

In one aspect, a polycarbonate polymer component as disclosed herein can be an aliphatic-diol based polycarbonate. In another aspect, the polycarbonate polymer component can comprise a carbonate unit derived from a dihydroxy compound, such as, for example, a bisphenol that differs from the aliphatic diol. In still further aspects, an exemplary polycarbonate polymer component includes aromatic polycarbonates conventionally manufactured through a transesterification reaction of an one or more aromatic dihydroxy compound(s) and a carbonic acid diester in the presence of one or more catalyst(s).

In one aspect, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxy-3 methylphenyl)cyclohexane 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl) sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

In another aspect, exemplary bisphenol compounds can comprise 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations comprising at least one dihydroxy aromatic compound can also be used. In another aspect, other types of diols can be present in the polycarbonate.

In a yet another aspect, polycarbonates with branching groups can be useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethylbenzyl)phenol), 4-chloroformyl phthalic anhydride, trimesic acid, and benzophenone tetracarboxylic acid. In one aspect, a branching agent can be added at a level of about 0.05 to about 2.0 wt %. In a still another aspect, mixtures comprising linear polycarbonates and branched polycarbonates can be used.

The polycarbonate polymer component can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate. Such copolymers further contain carbonate units derived from oligomeric ester-containing dihydroxy compounds (also referred to herein as hydroxy end-capped oligomeric acrylate esters). In another aspect, the first polycarbonate component does not comprise a separate polymer such as a polyester. In one aspect, an aliphatic-based polycarbonate comprises aliphatic units that are either aliphatic carbonate units derived from aliphatic diols, or a combination of aliphatic ester units derived from aliphatic diacids having greater than 13 carbons.

In one aspect, the molecular weight of any particular polycarbonate can be determined by, for example, gel permeation chromatography using universal calibration methods based on polystyrene (PS) standards. Generally polycarbonates can have a weight average molecular weight (Mw), of greater than about 5,000 g/mol based on PS standards. In one aspect, the polycarbonates can have an Mw of greater than or equal to about 20,000 g/mol, based on PS standards. In another aspect, the polycarbonates have an Mw based on PS standards of about 20,000 to 100,000 g/mol, including for example 30,000 g/mol, 40,000 g/mol, 50,000 g/mol, 60,000 g/mol, 70,000 g/mol, 80,000 g/mol, or 90,000 g/mol. In still further aspects, the polycarbonates have an Mw based on PS standards of about 22,000 to about 50,000 g/mol. In still further aspects, the polycarbonates have an Mw based on PS standards of about 25,000 to 40,000 g/mol.

Molecular weight (Mw and Mn) as described herein, and polydispersity as calculated therefrom, can be determined using gel permeation chromatography (GPC), using a crosslinked styrene-divinylbenzene column, and either PS or PC standards as specified. GPC samples can be prepared in a solvent such as methylene chloride or chloroform at a concentration of about 1 mg/ml, and can be eluted at a flow rate of about 0.2 to 1.0 ml/min. In one aspect, the glass transition temperature (Tg) of a polycarbonate can be less than or equal to about 160° C., less than or equal to about 150° C., less than or equal to about 145° C., less than or equal to about 140° C., or less than or equal to about 135° C. In a further aspect, the glass transition temperature of a polycarbonate can be from about 85° C. to about 160° C., from about 90° C. to about 160° C., from about 90° C. to about 150° C., or from about 90° C. to about 145° C. In a still further aspect, the glass transition temperature of a polycarbonate can be from about 85° C. to about 130° C., from about 90° C. to about 130° C., from about 90° C. to about 125° C., or from about 90° C. to about 120° C.

In one aspect, disclosed polycarbonate polymer components can be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions of, for example, about 8 to about 10.

The polycarbonate can, in various aspects, be prepared by a melt polymerization process. Generally, in the melt polymerization process, polycarbonates are prepared by co-reacting, in a molten state, the dihydroxy reactant(s) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue. In another aspect, a useful melt process for making polycarbonates utilizes a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl)carboxylate, bis(4-acetylphenyl)carboxylate, or a combination comprising at least one of the foregoing.

The melt polymerization can include a transesterification catalyst comprising a first catalyst, also referred to herein as an alpha catalyst, comprising a metal cation and an anion. In one aspect, the cation is an alkali or alkaline earth metal comprising Li, Na, K, Cs, Rb, Mg, Ca, Ba, Sr, or a combination comprising at least one of the foregoing. The anion is hydroxide ($OH^-$), superoxide ($O_2^-$), thiolate ($HS^-$), sulfide ($S_2^-$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethylenediamine tetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprising sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 μmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization. In another aspect, a second transesterification catalyst, also referred to herein as a beta catalyst, can optionally be included in the melt polymerization process, provided that the inclusion of such a second transesterification catalyst does not significantly adversely affect the desirable properties of the polycarbonate. Exemplary transesterification catalysts can further include a combination of a phase transfer catalyst of formula (R3)4Q+X above, wherein each R3 is the same or different, and is a C1-10 alkyl group; Q is a nitrogen or phosphorus atom; and X is a halogen atom or a C1-8 alkoxy group or C6-18 aryloxy group. Exemplary phase transfer catalyst salts include, for example, [CH3(CH2)3]4NX, [CH3(CH2)3]4PX, [CH3(CH2)5]4NX, [CH3(CH2)6]4NX, [CH3(CH2)4]4NX, CH3[CH3(CH2)3]3NX, and CH3[CH3(CH2)2]3NX, wherein X is Cl—, Br—, a C1-8 alkoxy group or a C6-18 aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, a melt process employing an activated carbonate is utilized. As used herein, the term "activated carbonate", is defined as a diarylcarbonate that is more reactive than diphenylcarbonate in transesterification reactions. Specific non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate. Examples of specific ester-substituted diarylcarbonates include, but are not limited to, bis(methylsalicyl)carbonate (CAS Registry No. 82091-12-1) (also known as BMSC or bis(o-methoxycarbonylphenyl)carbonate), bis(ethylsalicyl)carbonate, bis(propylsalicyl)carbonate, bis(butylsalicyl)carbonate, bis(benzylsalicyl)carbonate, bis(methyl-4-chlorosalicyl)carbonate and the like. In one aspect, bis(methylsalicyl)carbonate is used as the activated carbonate in melt polycarbonate synthesis due to its lower molecular weight and higher vapor pressure. Some non-limiting examples of non-activating groups which, when present in an ortho position, would not be expected to result in activated carbonates are alkyl, cycloalkyl or cyano groups. Some specific and non-limiting examples of non-activated carbonates are bis(o-methylphenyl)carbonate, bis(p-cumylphenyl) carbonate, bis(p-(1,1,3,3-tetramethyl)butylphenyl)carbonate and bis(o-cyanophenyl)carbonate. Unsymmetrical combinations of these structures can also be used as non-activated carbonates.

In one aspect, an end-capping agent (also referred to as a chain-stopper) can optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and C1-C22 alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. Certain monophenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

In another aspect, endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the endgroup of a polycarbonate can comprise a structural unit derived from a diaryl carbonate, where the structural unit can be an endgroup. In a further aspect, the endgroup is derived from an activated carbonate. Such endgroups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In another aspect, the ester endgroup derived from a salicylic ester can be a residue of BMSC or other substituted or unsubstituted bis(alkyl salicyl)carbonate such as bis(ethyl salicyl)carbonate, bis(propyl salicyl)carbonate, bis(phenyl salicyl)carbonate, bis(benzyl salicyl)carbonate, or the like. In one aspect, where a combination of alpha and beta catalysts are used in the melt polymerization, a polycarbonate polymer prepared from an activated carbonate can comprise endgroups in an amount of less than 2,000 ppm, less than 1,500 ppm, or less than 1,000 ppm, based on the weight of the polycarbonate. In another aspect, where only an alpha catalyst is used in the melt polymerization, a polycarbonate polymer prepared from an activated carbonate can comprise endgroups in an amount of less than or equal to 500 ppm, less than or equal to 400 ppm, less than or equal to 300 ppm, or less than or equal to 200 ppm, based on the weight of the polycarbonate.

In one aspect, the reactants for the polymerization reaction using an activated aromatic carbonate can be charged into a reactor either in the solid form or in the molten form. Initial charging of reactants into a reactor and subsequent mixing of these materials under reactive conditions for polymerization can be conducted in an inert gas atmosphere such as a nitrogen atmosphere. The charging of one or more reactants can also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all subranges there between, relative to the total moles of monomer unit compounds (i.e., aromatic dihydroxy compound, and aliphatic diacid or diol). In a specific aspect, the molar ratio of activated aromatic carbonate to monomer unit compounds is 1.013 to 1.29, specifically 1.015 to 1.028. In another specific aspect, the activated aromatic carbonate is BMSC.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be self-cleaning and should minimize any "hot spots." However, vented extruders similar to those that are commercially available can be used.

In one aspect, the aliphatic homopolycarbonate and aliphatic-aromatic copolycarbonate can be prepared in an extruder in presence of one or more catalysts, wherein the carbonating agent is an activated aromatic carbonate. In one aspect, the reactants for the polymerization reaction can be fed to the extruder in powder or molten form. In another aspect, the reactants are dry blended prior to addition to the extruder. The extruder can be equipped with pressure reducing devices (e.g., vents), which serve to remove the activated phenol by-product and thus drive the polymerization reaction toward completion. The molecular weight of the polycarbonate product can, in various aspects, be manipulated by controlling, among other factors, the feed rate of the reactants, the type of extruder, the extruder screw design and configuration, the residence time in the extruder, the reaction temperature and the pressure reducing techniques present on the extruder. The molecular weight of the polycarbonate product can also depend upon the structures of the reactants, such as, activated aromatic carbonate, aliphatic diol, dihydroxy aromatic compound, and the catalyst employed. Many different screw designs and extruder configurations are commercially available that use single screws, double screws, vents, back flight and forward flight zones, seals, and sidestreams. One skilled in the art can find the best designs using generally known principals of commercial extruder design. Controlling the ratio diarylcarbonate/diol, specifically BMSC/diol can impact the Mw when using an activated carbonate. A lower ratio can generally give a higher molecular weight.

In an exemplary aspect, the polycarbonate polymer component comprises a bisphenol A polycarbonate polymer. In another exemplary aspect, the polycarbonate component comprises a blend of at least two different grade bisphenol A polycarbonates. To that end, a polycarbonate grade can, for example, be characterized by the melt volume rate (MVR) of the polycarbonate. For example, a disclosed polycarbonate, such as a bisphenol A polycarbonate, can be characterized by exhibiting a melt Volume Rate (MVR) in the range of from 4 g/10 min to 30 g/10 min at 300° C./1.2 kg. For example, the MVR can range from 10 g/10 min to 25 g/10 min, including for example a MVR in the range of from 15 g/10 min to 20 g/10 min. Further, for example, the MVR can be in the range of from 4 g/10 min or 30 g/10 min.

The polycarbonate component can be present in the thermoplastic composition in any desired amount. For example, according to aspects of the disclosure, the polycarbonate polymer component can be present in an amount in the range of from about 5 weight % up to about 85 weight % relative to the total weight of the thermoplastic composition, including further exemplary amounts of about 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, and 80 weight %. In still further aspects, the polycarbonate component can be present within any range of amount derived from any two of the above states values. For example, the polycarbonate polymer component can be present in an amount in the range of from about 5 to about 15 weight %, or in an amount in the range of from about 5 weight % to about 20 weight %, or in an amount in the range of from about 50 weight % to about 85 weight %.

In aspects where the polycarbonate component comprises a blend of two or more polycarbonate polymers, it should be understood that each respect polycarbonate polymer present within the polycarbonate component can be present in any desired amount relative to the total weight percentage of the polycarbonate polymer component. For example, in an aspect wherein the polycarbonate polymer component comprises at least a first and a second polycarbonate polymer, the first polycarbonate polymer can be present in an amount in the range of from greater than 0 weight % to less than 100 weight % relative to the total weight of the polycarbonate polymer component. Similarly, the second polycarbonate polymer can also be present in an amount in the range of from greater than 0 weight % to less than 100 weight % relative to the total weight of the polycarbonate polymer component.

For example, in an exemplary aspect, a polycarbonate polymer component comprising two different grade bisphenol A polycarbonates can be present in the thermoplastic composition in an amount in the range of from about 14 to 16 weight percent. According to this aspect, a first bisphenol A polycarbonate can be present in an amount in the range of from about 5 to about 6 weight percent relative to the total weight of thermoplastic composition or, expressed in an alternative manner, in an amount in the range of from 35 weight percent to about 45 weight percent relative to the total weight percent of the polycarbonate component. Likewise, the second bisphenol A polycarbonate can be present in an amount in the range of from about 9 to about 10 weight percent relative to the total weight of thermoplastic composition or, expressed in an alternative manner, in an amount in the range of from 55 weight percent to about 65 weight percent relative to the total weight percent of the polycarbonate component. In at least one aspect, the at least one polycarbonate comprises at least 5 weight percentage relative to the thermoplastic composition's total weight percentage. For example, the total polycarbonate amount ranges from 5 wt % to 14 wt %, relative to the thermoplastic composition's total weight percentage.

In another exemplary aspect, a polycarbonate polymer component comprising two different grade bisphenol A polycarbonates can be present in the thermoplastic composition in an amount in the range of from about 70 to 72 weight percent. According to this aspect, a first bisphenol A polycarbonate can be present in an amount in the range of from about 53 to about 54 weight percent relative to the total weight of thermoplastic composition or, expressed in an alternative manner, in an amount in the range of from 73 weight percent to about 78 weight percent relative to the total weight percent of the polycarbonate component. Likewise, the second bisphenol A polycarbonate can be present in an amount in the range of from about 17 to about 18 weight percent relative to the total weight of thermoplastic composition or, expressed in an alternative manner, in an amount in the range of from 22 weight percent to about 27 weight percent relative to the total weight percent of the polycarbonate component.

B. Polycarbonate-Polysiloxane Copolymer

The disclosed thermoplastic compositions further comprise a polycarbonate-polysiloxane block copolymer component. As used herein, the term polycarbonate-polysiloxane copolymer is equivalent to polysiloxane-polycarbonate copolymer, polycarbonate-polysiloxane polymer, or polysiloxane-polycarbonate polymer. The polysiloxane-polycarbonate copolymer comprises polydiorganosiloxane blocks comprising structural units of the general formula (I) below:

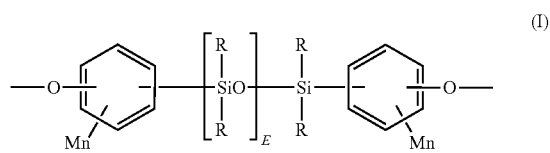

wherein the polydiorganosiloxane block length (E) is from about 20 to about 60; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and where each n is independently 0, 1, 2, 3, or 4. The polysiloxane-polycarbonate copolymer also comprises polycarbonate blocks comprising structural units of the general formula (II) below:

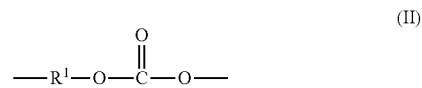

wherein at least 60 percent of the total number of $R^1$ groups comprise aromatic moieties and the balance thereof comprise aliphatic, alicyclic, or aromatic moieties According to exemplary non-limiting aspects of the disclosure, the polycarbonate-polysiloxane block copolymer comprises diorganopolysiloxane blocks of the general formula (III) below:

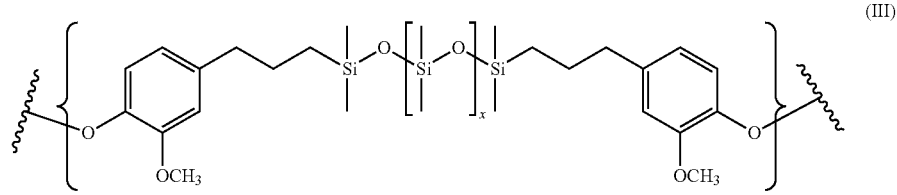

wherein x represents an integer from about 20 to about 60. The polycarbonate blocks according to these aspects can be derived from bisphenol-A monomers.

Diorganopolysiloxane blocks of formula (III) above can be derived from the corresponding dihydroxy compound of formula (IV):

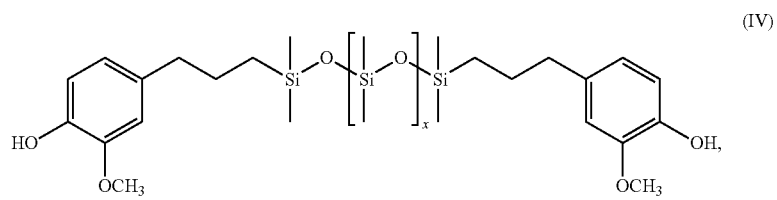

(IV)

wherein x is as described above. Compounds of this type and others are further described in U.S. Pat. No. 4,746,701 to Kress, et al and U.S. Pat. No. 8,017,0697 to Carrillo. Compounds of this formula can be obtained by the reaction of the appropriate dihydroxyarylene compound with, for example, an alpha, omega-bisacetoxypolydiorangonosiloxane under phase transfer conditions.

Such dihydroxy polysiloxanes can be made by effecting a platinum catalyzed addition between a siloxane hydride of the formula (V):

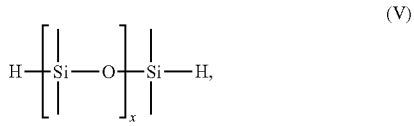

(V)

wherein x is a previously defined, and an aliphatically unsaturated monohydric phenol such as eugenol to yield a compound of formula (IV).

The polycarbonate-polysiloxane copolymer may be manufactured by reaction of a diphenolic polysiloxane, such as that depicted by formula (IV), with a carbonate source and a dihydroxy aromatic compound such as bisphenol-A, optionally in the presence of a phase transfer catalyst as described above. Suitable conditions are similar to those useful in forming polycarbonates. For example, the copolymers can be prepared by phosgenation at temperatures from below 0° C. to about 100° C., including for example, at temperatures from about 25° C. to about 50° C. Since the reaction is exothermic, the rate of phosgene addition can be used to control the reaction temperature. The amount of phosgene required will generally depend upon the amount of the dihydric reactants. Alternatively, the polycarbonate-polysiloxane copolymers can be prepared by co-reacting, in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy diorganopolysiloxane can be selected so as to provide the desired amount of diorganopolysiloxane units in the copolymer. The particular amounts used will therefore be determined depending on desired physical properties of the composition, the value of x (for example, within the range of about 20 to about 60), and the type and relative amount of each component in the composition, including the type and amount of polycarbonate, type and amount of polycarbonate-polysiloxane copolymer, and type and amount of any other additives. Suitable amounts of dihydroxy diorganopolysiloxane can be determined by one of ordinary skill in the art without undue experimentation using the guidelines taught herein.

For example, according to aspects of the disclosure, the polysiloxane-polycarbonate block copolymer can be provided having any desired level of siloxane content. For example, the siloxane content can be in the range of from 4 mole % to 20 mole %. In additional aspects, the siloxane content of the polysiloxane-polycarbonate block copolymer can be in the range of from 4 mole % to 10 mole %. In still further aspects, the siloxane content of the polysiloxane-polycarbonate block copolymer can be in the range of from 4 mole % to 8 mole %. In a further aspect, the polysiloxane-polycarbonate copolymer comprises a diorganosiloxane content in the range of from 5 to 7 mole wt %. In an even further exemplary aspect, the siloxane content of the polysiloxane-polycarbonate block copolymer can be about 6 mole %. Still further, the diorganopolysiloxane blocks can be randomly distributed in the polysiloxane-polycarbonate block copolymer.

The disclosed polysiloxane-polycarbonate block copolymers can also be end-capped as similarly described in connection with the manufacture of polycarbonates set forth herein. For example, according to aspects of the disclosure, a polysiloxane-polycarbonate block copolymer can be end capped with p-cumyl-phenol.

A non-limiting example of a polycarbonate-siloxane copolymer includes transparent EXL, available from SABIC Innovative Plastics. The transparent EXL from SABIC is a polycarbonate-polysiloxane (9030T) copolymer, having been tested commercially and found to have about 6 mole % siloxane, a Mw of about 44,600, and a Mn of about 17800 in a polystyrene standard using chloroform solvent.

The polysiloxane polycarbonate copolymer component can be present in the thermoplastic composition in any desired amount. For example, in aspects of the disclosure, the polysiloxane polycarbonate copolymer is present in an amount of at least 10 weight percent relative to the total weight of the thermoplastic composition. For example, the polycarbonate-polysiloxane copolymer can be present in an amount in the range of from 10 weight % to 80 weight % relative to the total weight of the thermoplastic composition, including exemplary amounts of 15 weight %, 20 weight %, 25 weight %, 30 weight %, 35 weight %, 40 weight %, 45 weight %, 50 weight %, 55 weight %, 60 weight %, 65 weight %, 70 weight %, and 75 weight %. In still further aspects, the polysiloxane polycarbonate copolymer can be present within any range of amounts derived from any two of the above stated values. For example, the polysiloxane polycarbonate copolymer can be present in an amount in the range of from about 10 to about 20 weight %, or in an amount in the range of from about 60 weight % to about 80 weight %.

C. Laser Direct Structuring Additive

The disclosed thermoplastic compositions further comprise a conventional laser direct structuring additive (LDS) additive. As used herein, a laser direct structuring additive refers to metal containing additives suitable for use in a laser direct structuring process. To that end, as discussed more fully herein, an LDS additive is selected such that, after activating with a laser, a conductive path can be formed by a subsequent standard metallization or plating process. As such, when the LDS additive is exposed to a laser, elemental metal is released or activated. The laser thus draws the circuit pattern onto the thermoplastic part and leaves behind a roughened surface containing embedded metal particles. These particles act as nuclei for the crystal growth during a subsequent metallization or plating process, such as a copper plating process or other plating processes, including gold plating, nickel plating, silver plating, zinc plating, tin plating or the like.

According to aspects of the disclosure, the laser direct structuring additive can comprise one or more metal oxides, including for example, oxides of chromium, copper, or combinations thereof. These laser direct structuring additives can also be provided having spinel type crystal structures. An exemplary and non-limiting example of a commercially available laser direct structuring additive includes PK3095 black pigment, commercially available from Ferro Corp., USA. The PK3095, for example, comprises chromium oxides ($Cr_2O_3$, $Cr_2O_4^{2-}$, $Cr_2O_7^{2-}$) and oxides of copper (CuO), as determined using XPS. The PK3095 black pigment also has a spinel type crystal structure. Another exemplary commercially available laser direct structuring additive is the Black 1G pigment black 28 commercially available from The Shepherd Color company. The Black 1G pigment black 28 comprises copper chromate and has a pH of about 7.3. The Black 1G pigment also has a spinel type crystal structure.

The laser direct structuring additive can be present in the thermoplastic composition in an amount in the range of from greater than zero to 15 weight % relative to the total weight of the thermoplastic composition, including for example, amounts of about 1 weight %, about 2 weight %, about 3 weight %, about 4 weight %, about 5 weight %, about 6 weight %, about 7 weight %, about 8 weight %, about 9 weight %, about 10 weight %, about 11 weight %, about 12 weight %, about 13 weight %, and about 14 weight %. In still further aspects, the laser direct structure (LDS) additive can be present in the thermoplastic composition in an amount within any range of amounts derived from any two of the above stated values. For example, the laser direct structuring additive can be present in an amount of from 7 weight % to 12 weight % relative to the total weight of the thermoplastic composition. Alternatively, the laser direct structuring additive can be present in the thermoplastic composition in an amount in the range of from 9 weight % to 14 weight % relative to the total weight of the thermoplastic composition. In an even further aspect, the laser direct structuring additive can be present in the thermoplastic composition in an amount of about 10 weight % relative to the total weight of the thermoplastic composition.

D. Siloxane Additive

The disclosed thermoplastic compositions further comprise a siloxane additive. As will be appreciated by one of ordinary skill in the art, some conventional laser direct structuring additives, such as those described herein, have levels of surface pH that can be detrimental to the base thermoplastic resin composition. For example, these levels of surface pH can lead to degradation of a thermoplastic base resin during compounding. As a consequence performance properties of the composition and parts formed from the resulting composition can be impacted. For example, impact properties and ductility of the composition can be reduced significantly. However, as exemplified more fully in the examples described herein, the presence of the siloxane additive can reduce or even eliminate harmful degradation of the base thermoplastic resin that can occur during the compounding process. This is exemplified, for example, by resulting thermoplastic compositions that are suitable for use in laser direct structuring while also maintaining or exhibiting desired performance properties as described herein.

Without wishing to be bound by theory, according to aspects of the disclosure, the siloxane additive and the laser direct structuring additive can together exhibit a chemical association. The chemical association can result in a modification of the LDS additive. For example, a chemical association may occur between the surface functionality of a copper chromate oxide and the functional groups of the siloxane additive. Non-limiting examples of chemical associations which can form between the LDS additive and the siloxane additive include chemical bonds, hydrogen bonds, electrostatic interaction of ions, and van der Waals forces. In another aspect, a chemical bond can be formed between an oxygen of the siloxane additive and a metal atom from the LDS additive, such as a copper chromate oxide. In another aspect, extrusion conditions used during processing or compounding of the thermoplastic composition can, for example, hydrolyze an alkoxy functionality (for example a methoxy (—OMe) group present on a siloxane additive) to an —OH. This resulting hydroxyl moiety can then be available to react with a surface functionality of an LDS additive (such as a copper chromate oxide).

According to aspects of the disclosure, a chemical reaction between the siloxane additive and the LDS additive can result in a modification or altering of the surface pH of the LDS additive. This modification of pH can reduce or even prevent degradation of the base thermoplastic resin during compounding. In another aspect, both the siloxane additive itself and the chemical reaction between the siloxane additive and the copper chromate oxide may alter the surface pH of the filler composition to prevent or to restrict the polymer matrix degradation during processing. In another aspect, the filler composition comprises an amino siloxane additive and a copper chromate oxide that forms a chemical bond.

The modification may, for example involve one of two routes: 1) in-situ modification and 2) ex-situ modification. The in-situ modification involved a single stage operation during extrusion. For example, in the in-situ modification, the siloxane additive is added directly during the extrusion process along with the polycarbonate polymer, the polysiloxane-polycarbonate copolymer, the laser direct structuring additive, and any additional ingredients. The ex-situ modification involves multiple steps, such as at least two steps. For example, ex-situ modification can comprise treating the laser direct structuring additive with a siloxane additive. Alternatively, ex-situ modification can comprise treating the laser direct structuring additive with a coupling agent and/or compatibilizer. The composition thus treated can then fed into the extrusion as the second step of the process. Either modification process or extrusion process may, for example, be performed at room temperature or 23° C.

In another aspect, the siloxane additive may be absorbed onto the surface of the copper chromate oxide. The chemical association between the siloxane additive and the copper chromate oxide can, for example, be shown using x-ray photoelectron spectroscopic ("XPS") analysis or Fourier transform infrared spectroscopy ("FTIR").

The siloxane additive can be polymeric or oligomeric in nature or, alternatively, can be monomeric or a single compound. As previously mentioned, the at least one filler composition comprises at least one siloxane additive. The at least one siloxane additive may, for example, comprise functional groups selected from amino groups, phenyl groups, and epoxy groups. Non-limiting examples of siloxane additives may include epoxysilane, aminosilane, aminosiloxane, or phenylsiloxane. In one aspect, the siloxane additive comprises an aminosiloxane. In another aspect, the siloxane additive comprises a phenyl siloxane.

The siloxane additive can be an aminosiloxane such as an amodimethicone silsequioxane or a mixture comprising an amodimethicone silsequioxane. As used herein, "amodimethicone" refers to amine-functionalized silicone. For example, polydimethylsiloxane (dimethicone, by INCI naming standards), consists of methyl groups (—CH$_3$) as the pendant group along the backbone of the polymer chain. Amine-functionalized silicones have been chemically modified so that some of the pendant groups along the backbone have been replaced with various alkylamine groups (-alkyl-NH$_2$). In various aspects, the aminosiloxane can comprise about 60 wt % to about 90 wt % of a mixture of siloxanes and silicones, including dimethyl polymers with methyl silsequioxanes and about 10 wt % to about 30 wt % aminofunctional oligosiloxane. For example, a suitable aminosiloxane mixture comprising an amodimethicone silsequioxane is SF-1706, which is commercially available from Momentive Performance Materials, USA. Alternatively, a suitable aminosiloxane can comprise a 25/75 mixture of methoxy terminated aminoethylaminopropyl polysiloxane and methoxy terminated siloxane resin.

In one aspect, the aminosiloxane can comprise one or more oligomeric or polymeric siloxane compounds having a structure represented by the formula:

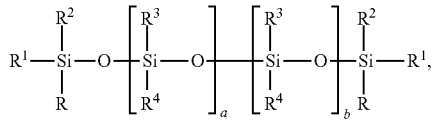

wherein each occurrence of R and R$^2$ is a substituted or unsubstituted group independently selected from alkyl, aryl, olefinic (vinyl), and —OR$^5$; wherein each occurrence of R$^1$ is independently selected from a substituted or unsubstituted group selected from alkyl, aryl, olefinic (vinyl), —OR$^4$, and a diamino group containing the radical —F$^1$—NR$^6$—F—NH$_2$, with the proviso that at least one R$^1$ group is a diamino containing radical; wherein F$^1$ is a linear or branched alkylene of 1-12 carbon atoms; F is linear or branched alkylene of 2-10 carbon atoms; wherein each occurrence of R$^3$ and R$^4$ is independently selected from substituted or unsubstituted alkyl, aryl, capped or uncapped polyoxyalkylene, alkaryl, aralkylene or alkenyl; wherein each occurrence of R$^5$ is independently hydrogen or alkyl; wherein each occurrence of R$^6$ is independently hydrogen or lower alkyl; wherein a is an integer from 0 to 10,000; and wherein b is an integer from 10 to 1000, with the proviso that a and b are present in a ratio of a:b of at least 1:1 to 200:1.

In various aspects, the aminosiloxane can be a mixture comprising a compound having a structure represented by the formula:

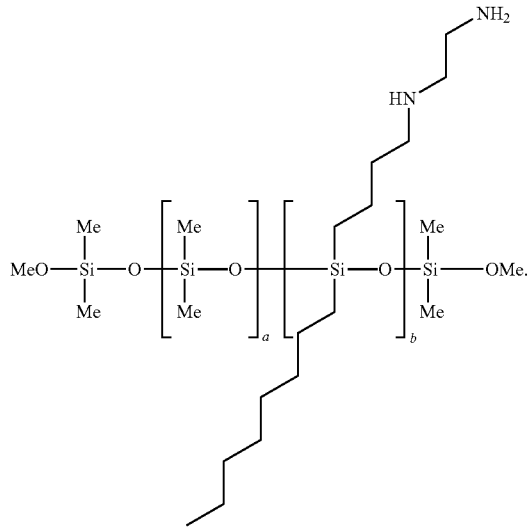

Alternatively, the aminosiloxane can be a curable amine functional silicone such as the commercially available curable amine functional silicones Dow Corning Silicone 531 and 536, and SWS Silicones Corp. SWS E-210. Other suitable curable amino functional silicones are also sold by Wacker, Siltech Corporation, and others. The terms "amine functional silicone," "aminosiloxane," and "aminoalkylsiloxane" are synonymous and are used interchangeably in the literature. The term "amine" as used herein means any suitable amine, and particularly cycloamine, polyamine and alkylamine, which include the curable alkylmonoamine, alkyldiamine and alkyltriamine functional silicones.

In one aspect, the siloxane additive can comprise a commercially available silicone such as SFR-100 (Momentive Performance Materials) or EC4952 silicone (Emerson Cummings Co., USA). SFR-100 silicone is characterized as a silanol- or trimethylsilyl-terminated polymethylsiloxane and is a liquid blend comprising about 60-80 weight percent of a difunctional polydimethylsiloxane having a number-average molecular weight of about 150,000, and 20-40 weight percent of a polytrimethylsilyl silicate resin having monofunctional (i.e. trimethylsiloxane) and tetrafunctional (i.e. SiO$_2$) repeating units in an average ratio of between about 0.8 and 1 to 1 and having a number-average molecular weight of about 2,200. EC4952 silicone is characterized as a silanol-terminated polymethylsiloxane having about 85 mole percent of difunctional dimethylsiloxane repeating units, about 15 mole percent of trifunctional methylsiloxane repeating units and having a number-average molecular weight of about 21,000. Other polyfunctional poly(C1-6 alkyl)siloxane polymers which can be used are disclosed in U.S. Pat. Nos. 4,387,176 and 4,536,529, the disclosures of which are hereby incorporated by reference.

In various aspects, the siloxane additive can comprise a phenylsiloxane, for example, may be commercially available as phenyl-containing siloxane fluid, called SE 4029 from Momentive Performance Materials, USA.

In one aspect, the siloxane additive is present in a super addition amount in the range of from greater than 0 weight % to 5 weight %. The at least one siloxane additive present in a super addition amount may range from 0.25 wt % to 5.0 wt %, for example ranging from 0.5 wt % to 4.0 wt %, ranging from 1 wt % to 4 wt %, ranging from 0.75 wt % to 2.5 wt %, ranging from 1 wt % to 3 wt % or ranging from 1 wt % to 2 wt %, based on the total weight of the composition.

E. Optional Thermoplastic Composition Additives

The disclosed thermoplastic compositions can optionally comprise one or more additives conventionally used in the manufacture of molded thermoplastic parts with the proviso that the optional additives do not adversely affect the desired properties of the resulting composition. Mixtures of optional additives can also be used. Such additives may be mixed at a suitable time during the mixing of the components for forming the composite mixture. For example, the disclosed compositions can comprise one or more fillers, plasticizers, stabilizers, anti-static agents, flame-retardants, impact modifiers, colorant, antioxidant, and/or mold release agents. In one aspect, the composition further comprises one or more optional additives selected from an antioxidant, flame retardant, inorganic filler, and stabilizer.

Exemplary heat stabilizers include, for example, organo phosphites such as triphenyl phosphite, tris-(2,6-dimethylphenyl)phosphite, tris-(mixed mono- and di-nonylphenyl) phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

Exemplary antioxidants include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of paracresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

The disclosed thermoplastic compositions can further comprise an optional filler, such as, for example, an inorganic filler or reinforcing agent. The specific composition of a filler, if present, can vary, provided that the filler is chemically compatible with the remaining components of the thermoplastic composition. In one aspect, the thermoplastic composition comprises a mineral filler. In another aspect, the thermoplastic composition comprises a filler comprising talc. If present, the amount of filler can comprise any amount suitable for the thermoplastic composition that does not adversely affect the desired properties thereof.

In another aspect, an exemplary filler can comprise silicates and silica powders, such as aluminum silicate (mullite), synthetic calcium silicate, zirconium silicate, fused silica, crystalline silica graphite, natural silica sand, or the like; boron powders, such as boron-nitride powder, boron-silicate powders, or the like; oxides, such as $TiO_2$, aluminum oxide, magnesium oxide, or the like; calcium sulfate (as its anhydride, dihydrate or trihydrate), or the like; talc, including fibrous, modular, needle shaped, lamellar talc, or the like; wollastonite; surface-treated wollastonite; glass spheres such as hollow and solid glass spheres, silicate spheres, aluminosilicate, or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers), carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), aromatic polyamides, aromatic polyimides, polyetherimides, polytetrafluoroethylene, or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

Exemplary light stabilizers include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Exemplary plasticizers include, for example, phthalic acid esters such as dioctyl-4,5-epoxy-hexahydrophthalate, tris-(octoxycarbonylethyl)isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Exemplary antistatic agents include, for example, glycerol monostearate, sodium stearyl sulfonate, sodium dodecylbenzenesulfonate or the like, or combinations of the foregoing antistatic agents. In one aspect, carbon fibers, carbon nanofibers, carbon nanotubes, carbon black, or any combination of the foregoing may be used in a polymeric resin containing chemical antistatic agents to render the composition electrostatically dissipative.

Exemplary mold releasing agents include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from 0.1 to 1.0 parts by weight, based on 100 parts by weight of the total composition, excluding any filler.

Exemplary UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight of the total composition, excluding any filler.

Exemplary lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Exemplary blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

As noted above, the disclosed thermoplastic compositions can optionally further comprises a flame retardant additive. In various aspects, the flame retardant additive can comprise any flame retardant material or mixture of flame retardant materials suitable for use in the inventive thermoplastic compositions. In another aspect, the flame retardant additive comprises a phosphate containing material. In another aspect, the flame retardant additive comprises a halogen containing material. In other aspects, the flame retardant additive is free of or substantially free of one or more of phosphate and/or a halogen. In still another aspect, the flame retardant additive comprises an oligomer organophosphorous flame retardant, including for example, bisphenol A diphenyl phosphate (BPADP). In a further aspect, the flame retardant is selected from oligomeric phosphate, polymeric phosphate, oligomeric phosphonate, or mixed phosphate/phosphonate ester flame retardant compositions. In a still further aspect, the flame retardant is selected from triphenyl phosphate; cresyl-diphenylphosphate; tri(isopropylphenyl)phosphate; resorcinol bis(diphenylphosphate); and bisphenol-A bis(diphenyl phosphate). In a yet further aspect, the flame retardant is bisphenol-A bis(diphenyl phosphate).

The concentration of a flame retardant additive can vary, and the present invention is not intended to be limited to any particular flame retardant concentration. In one aspect, the disclosed composition can comprises from greater than 0% to about 20 wt % of flame retardant additive, including for example, about 1, 2, 3, 4, 5, 6, 7, 8, 9, 10, 11, 12, 13, 14, 15, 16, 17, 18, or 19 weight %. In still further aspects, the flame retardant additive can be present in any range of amounts derived from the above values. For example, the flame retardant additive can be present in the polycarbonate composition in an amount in the range of from about 5 weight % to about 15 weight %, or event from about 10 weight percent to about 20 weight %. Flame retardant additives are commercially available, and one of skill in the art could readily select an appropriate flame retardant additive.

Additionally, materials to improve flow and other properties may be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

Methods of Manufacture

In a further aspect, the invention relates to a method for making a thermoplastic composition, the method comprising forming a blended composition comprising: (a) polycarbonate polymer; (b) a polysiloxane-polycarbonate copolymer; (c) a laser direct structuring additive; and (d) a siloxane additive; wherein a molded article having a thickness of 3.2 mm formed from the blend composition exhibits a notched izod impact energy that is at least 10% greater than that exhibited by a molded article formed from an identical reference blend composition in the absence of the siloxane additive.

In one aspect, the laser direct structuring process involves three steps: 1) injection molding, 2) laser structuring, and 3) metallizing.

In a further aspect, during the injection molding step, the laser direct structuring additive and siloxane additive may be mixed with the polycarbonate polymer and the polysiloxane-polycarbonate copolymer. In another aspect, the blend composition further comprises one or more optional additives selected from an antioxidant, flame retardant, inorganic filler, and stabilizer. In a still further aspect, single shot injection molding can be used to produce the parts or articles to be laser structured. In at least one aspect, the thermoplastic composition may be mixed at this step and used in the LDS process. In another aspect, additional ingredients may be added to the thermoplastic composition after this step.

As described herein, the present invention relates to blended thermoplastic compositions. The blended thermoplastic compositions of the present disclosure may be formed using any known method of combining multiple components to form a thermoplastic resin. In one aspect, the components are first blended in a high-speed mixer. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. The extruder is generally operated at a temperature higher than that necessary to cause the composition to flow. The extrudate is immediately quenched in a water batch and pelletized. The pellets so prepared when cutting the extrudate may be one-fourth inch long or less as desired. Such pellets may be used for subsequent molding, shaping, or forming. In one aspect, the blend composition is formed by extrusion blending.

In a further aspect, during the laser structuring step, a laser is used to form a conductive path during the laser structuring step. In a still further aspect, the laser used to form a conductive path is laser direct structuring. In a yet further aspect, laser direct structuring comprises laser etching. In an even further aspect, laser etching is carried out to provide an activated surface.

In a further aspect, at least one laser beam draws at least one pattern on the surface of the thermoplastic composition during the laser structuring step. In a still further aspect, the employed filler composition may release at least one metallic nucleus. In a yet further aspect, the at least one metallic nucleus that has been released may act as a catalyst for reductive copper plating process.

In a further aspect, laser etching is carried out at about 1 w to about 10 w power with a frequency from about 30 kHz to about 110 kHz and a speed of about 1 m/s to about 5 m/s. In a still further aspect, laser etching is carried out at about 1 w to about 10 w power with a frequency from about 40 kHz to about 100 kHz and a speed of about 2 m/s to about 4 m/s. In a yet further aspect, laser etching is carried out at about 3.5 w power with a frequency of about 40 kHz and a speed of about 2 m/s.

In a further aspect, a rough surface may form in the LDS process. In a still further aspect, the rough surface may entangle the copper plate with the polymer matrix in the thermoplastic composition, which may provide adhesion between the copper plate and the thermoplastic composition.

The metallizing step can, in various aspects, be performed using conventional techniques. For example, in one aspect, an electroless copper plating bath is used during the metallization step in the LDS process. Thus, in various aspects, plating a metal layer onto a conductive path is metallization. In a still further aspect, metallization can comprise the steps: a) cleaning the etched surface; b) additive build-up of tracks; and c) plating.

In a further aspect, the method comprises making a thermoplastic composition wherein a molded article forming from the composition exhibits a notched izod impact energy that is at least 100% greater than that exhibited by a molded article formed from an identical reference composition in the absence of the siloxane additive. In still further aspect, the molded article formed from the composition exhibits a notched izod impact energy that is at least 500% greater than that exhibited by a molded article formed from an identical reference composition in the absence of the siloxane additive.

In one aspect, the formed blend composition comprises: (a) a bisphenol A polycarbonate polymer; (b) a polysiloxane-polycarbonate block copolymer comprising diorganopolysiloxane blocks of the general formula (VII):

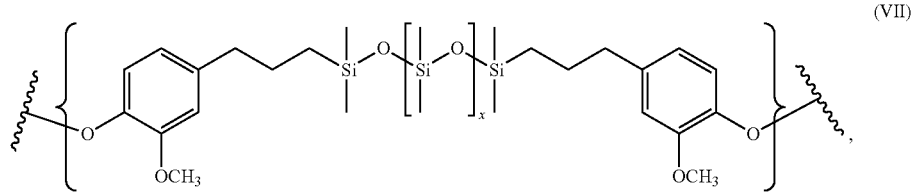

(VII)

wherein x is from about 40 to about 60; and polycarbonate blocks are derived from bisphenol-A monomers;
wherein the diorganopolysiloxane blocks are randomly distributed in the polysiloxane-polycarbonate block copolymer;
wherein the siloxane content of the polysiloxane-polycarbonate block copolymer ranges from 4 mole % to 20 mole %;
(c) a laser direct structuring additive; and
(d) a siloxane additive;
wherein the molded article formed from the composition exhibits a notched izod impact energy at 23° C. of at least 500 J/m and a notched izod impact energy at −23° C. of at least 300 J/m.

Articles of Manufacture

Shaped, formed, or molded articles including the thermoplastic compositions are also provided. The thermoplastic compositions can be molded into useful shaped articles by a variety of means such as injection molding, extrusion, rotational molding, blow molding and thermoforming to form articles such as, for example, personal computers, notebook and portable computers, cell phone antennas and other such communications equipment, medical applications, RFID applications, automotive applications, and the like.

The blended thermoplastic compositions, or compounds, disclosed herein provide robust plating performance while maintaining good mechanical properties, for example, a notched izod impact energy at 23° C. of at least 500 J/m or a notched izod impact energy at −23° C. of at least 300 J/m. Evaluation of the mechanical properties can be performed through various tests, such as Izod test, Charpy test, Gardner test, etc., according to several standards (e.g., ASTM D256). Robustness of plating performance can be measured via a performance ranking, or plating ranking, ranging from top performance (e.g., "best") to bottom performance. The ranking can be partitioned in various levels. In one aspect, a plating ranking can have a level of "10" for top performance and a level of "0" for bottom performance.

In a further aspect, the method comprises forming a molded part from the formed blend composition. In another aspect, the method further comprises subjecting the molded part to a laser direct structuring process.

In one aspect, the molded article formed from the composition exhibits ductile failure mode according to ASTM D256-2010.

In several aspects, the LDS compounds include a fixed loading amount of an LDS additive, such as copper chromium oxide, and varying amounts of thermoplastic base resins. In such aspects, fixed loading amounts of a stabilizer, an antioxidant, and a mold release agent were maintained in the LDS compounds.

In one aspect, the article comprises the product of extrusion molding or injection molding a composition comprising: (a) polycarbonate polymer; (b) a polysiloxane-polycarbonate copolymer; (c) a laser direct structuring additive; and (d) a siloxane additive; wherein a molded article having a thickness of 3.2 mm formed from the blend composition exhibits a notched izod impact energy that is at least 10% greater than that exhibited by a molded article formed from an identical reference blend composition in the absence of the siloxane additive.

In a further aspect, the molded article further comprises a conductive path formed by activation with a laser. In a yet further aspect, the article further comprises a metal layer plated onto the conductive path. In an even further aspect, the metal layer is a copper layer. In a still further aspect, the metal layer has a thickness of about 0.8 micrometers or higher as measured according to ASTM B568.

In various aspects, the thermoplastic composition may be used in the field of electronics. In a further aspect, non-limiting examples of fields which may use 3D MIDs, LDS process, or thermoplastic composition include electrical, electro-mechanical, Radio Frequency (RF) technology, telecommunication, automotive, aviation, medical, sensor, military, and security. In a still further aspect, the use of 3D MIDs, LDS processes, or thermoplastic compositions may also be present in overlapping fields, for example in mechatronic systems that integrate mechanical and electrical properties which may, for example, be used in automotive or medical engineering.

In one aspect, molded articles according to the present invention can be used to produce a device in one or more of the foregoing fields. In a still further aspect, non-limiting examples of such devices in these fields which may use 3D MIDs, LDS processes, or thermoplastic compositions according to the present invention include computer devices, household appliances, decoration devices, electromagnetic interference devices, printed circuits, Wi-Fi devices, Bluetooth devices, GPS devices, cellular antenna devices, smart phone devices, automotive devices, military devices, aerospace devices, medical devices, such as hearing aids, sensor devices, security devices, shielding devices, RF antenna devices, or RFID devices.

In a still further aspect, the molded articles can be used to manufacture devices in the automotive field. In a further aspect, non-limiting examples of such devices in the automotive field which may use 3D MIDs, LDS processes, or the disclosed thermoplastic compositions in the vehicle's interior include adaptive cruise control, headlight sensors, windshield wiper sensors, and door/window switches. In a further aspect, non-limiting examples of devices in the automotive field which may use 3D MIDs, LDS process, or the disclosed thermoplastic compositions in the vehicle's exterior include pressure and flow sensors for engine management, air conditioning, crash detection, and exterior lighting fixtures.

Plastic plating was developed for industrial application because of the low cost, the ability to mold large and complex parts, and the reduction of weight. Plastic plating also allows the rapid development of new designs and reduced space requirements in both production and the devices themselves. As gasoline prices rise, consumers have become more interested in automotive weight reduction. Non-limiting examples of plastic materials which may be plated include acrylonitrile butadiene styrene (ABS), polypropylene, polysulfone, polyethersulfone, polyetherimide, Teflon, polyarylether, polycarbonate, polyphenylene oxide, polyacetel. The LDS process may be used for plastic plating and the plastic material may be included in the thermoplastic composition or in the polymer matrix of the thermoplastic composition.

In one aspect, the molded articles may have a thickness ranging from 1.2 mm to 2.0 mm. For example, the molded article may have a thickness of 1.6 mm. In further aspect, the molded article may have a thickness ranging from 2.8 to 3.5 mm. For example, the molded article may have a thickness of 3.2 mm.

In a further aspect, the resulting disclosed compositions can be used to provide any desired shaped, formed, or molded articles. For example, the disclosed compositions may be molded into useful shaped articles by a variety of means such as injection molding, extrusion, rotational molding, blow molding and thermoforming. As noted above, the disclosed compositions are particularly well suited for use in the manufacture of electronic components and devices. As such, according to some aspects, the disclosed compositions can be used to form articles such as printed circuit board carriers, burn in test sockets, flex brackets for hard disk drives, and the like.

The disclosed methods include at least the following aspects.

Aspect 1: A thermoplastic composition comprising:
 a. a polycarbonate polymer;
 b. a polysiloxane-polycarbonate copolymer;
 c. a laser direct structuring additive; and
 d. a siloxane additive;
wherein a molded article having a thickness of 3.2 mm formed from the composition exhibits a notched izod impact energy that is at least 10% greater than that exhibited by a molded article formed from an identical reference composition in the absence of the siloxane additive.

Aspect 2: The thermoplastic composition of aspect 1, wherein the molded article formed from the composition exhibits a notched izod impact energy that is at least 100% greater than that exhibited by a molded article formed from an identical reference composition in the absence of the siloxane additive.

Aspect 3: The thermoplastic composition of aspect 1, wherein the molded article formed from the composition exhibits a notched izod impact energy that is at least 500% greater than that exhibited by a molded article formed from an identical reference composition in the absence of the siloxane additive.

Aspect 4: The thermoplastic composition of any of aspects 1-3, comprising:
 a. a bisphenol A polycarbonate polymer;
 b. a polysiloxane-polycarbonate block copolymer comprising diorganopolysiloxane blocks of the general formula (VII):

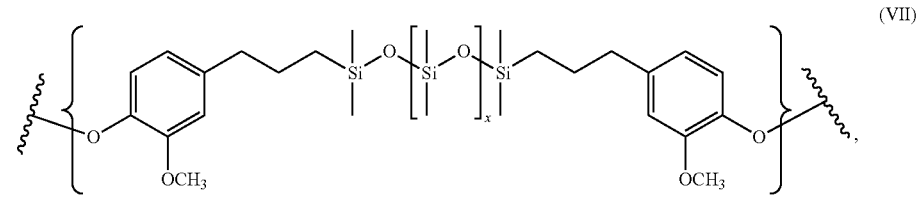

wherein x is from about 40 to about 60; and polycarbonate blocks are derived from bisphenol-A monomers;
 wherein the diorganopolysiloxane blocks are randomly distributed in the polysiloxane-polycarbonate block copolymer;
 wherein the siloxane content of the polysiloxane-polycarbonate block copolymer is about 20 wt %;
 c. a laser direct structuring additive; and
 d. an siloxane additive;

Aspect 5: The thermoplastic composition of aspect 4, wherein the bisphenol A polycarbonate polymer of a) comprises a blend of at least two different bisphenol A polycarbonates.

Aspect 6: The thermoplastic composition of any of aspect 1-5, wherein the molded article formed from the composition exhibits ductile failure mode as measured according to ASTM D256-2010.

Aspect 7: The thermoplastic composition of aspects 1-6, comprising:
 a. from 5 weight % to 20 weight % bisphenol A polycarbonate relative to the total weight of the thermoplastic composition in the absence of the oligomeric siloxane additive;
 b. from 50 to 80 weight % polysiloxane-polycarbonate copolymer relative to the total weight of the thermoplastic composition in the absence of the siloxane additive;

Aspect 8: The thermoplastic composition of any of aspects 1-7, wherein the laser direct structuring additive is present in the thermoplastic composition in an amount of from 5 weight % to 15 weight % relative to the total weight of the thermoplastic composition in the absence of the siloxane additive.

Aspect 9: The thermoplastic composition of any of aspects 1-8, wherein the laser direct structuring additive is selected from a heavy metal mixture oxide spinel, a copper salt, or a combination thereof.

Aspect 10: The thermoplastic composition of any of aspects 1-9, wherein the laser direct structuring additive comprises copper chromium oxide spinel.

Aspect 11: The thermoplastic composition of any of aspects 1-10, wherein the siloxane additive is present in a super addition amount in the range of from greater than 0 weight % to 5 weight %.

Aspect 12: The thermoplastic composition of any of aspects 1-11, wherein the siloxane additive is present in a super addition amount in the range of from 1 weight % to 3 weight %.

Aspect 13: The thermoplastic composition of any of aspects 1-12, wherein the siloxane additive comprises an amino siloxane.

Aspect 14: The thermoplastic composition of any of aspects 1-13, wherein the siloxane additive comprises a phenyl siloxane.

Aspect 15: The thermoplastic composition of any of aspects 1-14, further comprising one or more optional additives selected from an antioxidant, flame retardant, inorganic filler, and stabilizer.

Aspect 16: A method for making a thermoplastic composition; comprising forming a blend composition comprising:
  a. a polycarbonate polymer;
  b. a polysiloxane-polycarbonate copolymer;
  c. a laser direct structuring additive; and
  d. a siloxane additive;
wherein a molded article having a thickness of 3.2 mm formed from the blend composition exhibits a notched izod impact energy that is at least 10% greater than that exhibited by a molded article formed from an identical reference blend composition in the absence of the siloxane additive.

Aspect 17: The method of aspect 16, wherein the molded article formed from the composition exhibits a notched izod impact energy that is at least 100% greater than that exhibited by a molded article formed from an identical reference composition in the absence of the siloxane additive.

Aspect 18: The method of aspect 16, wherein the molded article formed from the composition exhibits a notched izod impact energy that is at least 500% greater than that exhibited by a molded article formed from an identical reference composition in the absence of the siloxane additive.

Aspect 19: The method of any of aspects 16-18, wherein the formed blend composition comprises:
  a. a bisphenol A polycarbonate polymer;
  b. a polysiloxane-polycarbonate block copolymer comprising diorganopolysiloxane blocks of the general formula (VII):
    wherein x is from about 40 to about 60; and polycarbonate blocks are derived from bisphenol-A monomers;
    wherein the diorganopolysiloxane blocks are randomly distributed in the polysiloxane-polycarbonate block copolymer;
    wherein the siloxane content of the polysiloxane-polycarbonate block copolymer ranges from 4 mole % to 20 mole %;
  c. a laser direct structuring additive; and
  d. a siloxane additive;
  wherein the molded article formed from the composition exhibits a notched izod impact energy at 23° C. of at least 500 J/m and a notched izod impact energy at −23° C. of at least 300 J/m.

Aspect 20: The method of any of aspects 16-19, wherein the bisphenol A polycarbonate polymer comprises a blend of at least two different bisphenol A polycarbonates.

Aspect 21: The method of any of aspects 16-20, wherein the molded article formed from the composition exhibits Notched Izod Impact ductile failure mode according to ASTM D256-2010.

Aspect 22: The method of any of aspects 16-21, wherein the formed blend composition comprises:
  a. from 5 weight % to 20 weight % bisphenol A polycarbonate relative to the total weight of the thermoplastic composition in the absence of the siloxane additive;
  b. from 50 to 80 weight % polysiloxane-polycarbonate copolymer relative to the total weight of the thermoplastic composition in the absence of the siloxane additive.

Aspect 23: The method of any of aspects 16-22, wherein the laser direct structuring additive is present in the formed blend composition in an amount of from 5 weight % to 15 weight % relative to the total weight of the thermoplastic composition in the absence of the siloxane additive.

Aspect 24: The method of any of aspects 16-23, wherein the laser direct structuring additive is selected from a heavy metal mixture oxide spinel, a copper salt, or a combination thereof.

Aspect 25: The method of any of aspects 16-24, wherein the laser direct structuring additive comprises copper chromium oxide spinel.

Aspect 26: The method of any of aspects 16-25, wherein the siloxane additive is present in the formed blend composition in a super addition amount in the range of from greater than 0 weight % to 5 weight %.

Aspect 27: The method of any of aspects 16-26, wherein the siloxane additive is present in the formed blend in a super addition amount in the range of from 1 weight % to 3 weight %.

Aspect 28: The method of any of aspects 16-27, wherein the siloxane additive comprises an amino siloxane.

Aspect 29: The method of any of aspects 16-28, wherein the siloxane additive comprises a phenyl siloxane.

Aspect 30: The method of any of aspects 16-29, wherein the blend composition further comprises one or more optional additives selected from an antioxidant, flame retardant, inorganic filler, and stabilizer.

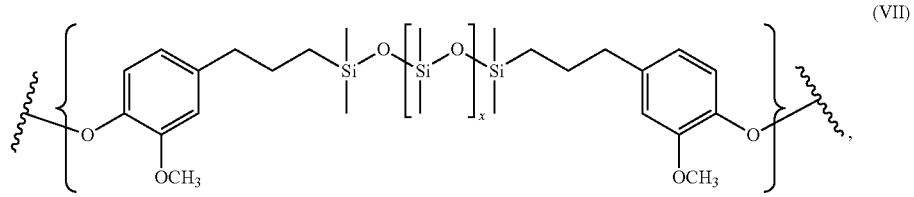

(VII)

Aspect 31: The method of any of aspects 16-30, wherein the blend composition is formed by extrusion blending.

Aspect 32: The method of any of aspects 16-31, further comprising forming a molded part from the formed blend composition.

Aspect 33: The method of any of aspects 16-32, further comprising subjecting the molded part to a laser direct structuring process.

EXAMPLES

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in degrees Celsius (° C.) or is at ambient temperature, and pressure is at or near atmospheric.

General Materials and Methods

For the non-limiting Examples described herein below, sample compositions were prepared from the components described in Table 1 below. The Example compositions (labeled as "Example 1," "Example 2," and the like) and various comparator samples (labeled as "Comp. 1," "Comp. 2," and the like) are further described herein. Molded articles were prepared for analysis.

TABLE 1

| Identifier | Description | Source |
| --- | --- | --- |
| PC1 | BPA polycarbonate resin made by a melt process with an MVR of 23.5-28.5 g/10 min at 300° C./1.2 kg. | SABIC Innovative Pastics ("SABIC IP") |
| PC2 | BPA polycarbonate resin made by a melt process with an MVR of 5.1-6.9 g/10 min at 300° C./1.2 kg. | SABIC IP |
| PC3 | 100 Grade PCP | SABIC IP |
| PC4 | PC Resin 1300 with end-capped PCP | SABIC IP |
| PC/PS | Polycarbonate-siloxane copolymer comprising about 6 mole percent siloxane with a Mw of 44658, Mn of 17850. The Mw and Mn are as determined by gel permeation chromatography ("GPC") using polystyrene standard and chloroform as the mobile phase. | SABIC IP |
| PETS | Pentaerythritol tetrastearate | Merc |
| LDS1 | Black copper chromium oxide spinel;. (Tradename: Pigment Black PK 3095) | Ferro Corporation |
| LDS2 | Black copper chromium oxide spinel. (Tradename: Black 1G). | The Shepherd Color Company |
| AO1 | Pentaerythritol tetrakis(3-(3,5-di-tert-butyl-4-hydroxyphenyl)propionate) which is a sterically hindered phenolic antioxidant. (Tradename: Irganox ®1010) | Ciba Specialty Chemicals ("CIBA") |
| AO2 | 1,2-bis(3,5-di-tert-butyl-4-hydroxyhydrocinnamoyl)hydrazine, a sterically hindered phenol antioxidant. (Tradename: BNX ® MD1024) | Mayzo |
| AO3 | Tris (2,4-di-tert-butylphenyl)phosphite, a trisaryl phosphite antioxidant (Tradename: Irgafos ® 168) | CIBA |
| AO4 | Octadecyl-3-(3,5-di-tert.butyl-4-hydroxyphenyl)-propionate which is a sterically hindered phenolic antioxidant (Tradename: Irganox 1076). | CIBA |
| UV1 | 2-(2-Hydroxy-5-t-octylphenyl) benzotriazole, a UV stabilizer. | — |
| ZI | Zinc ionomer comprising a hydrophilic copolymer of ethylene and acrylic acids; with a molecular weight of 1,000 to 3,000, a melting point of about 99° C.; and an acid number of nil. (Tradename: AClyn ® 295) | Merc |
| FIL | Aluminosilicate filler. (Tradename: Talc HT S0.5) | Luzenac |
| PA | Phosphoric acid, 45% aqueous solution. | — |
| PAE | Phosphoric acid ester (Phosphonous acid,P,P'-[[1,1'-biphenyl]-4,4'-diyl]bis-,P,P,P',P'-tetrakis[2,4-bis(1,1-dimethylethyl)phenyl] ester) | — |
| ZP | Mono zinc phosphate | — |
| SO1 | An oligomeric amine functional siloxane fluid comprising a copolymer of methylsilsesquioxane, polydimethylsiloxane and poly(ethylaminopropyl)methysiloxane; with an internal viscosity of about 50 centistokes (cSt); amine content of about 0.46 milliequivalents of base per gram of oligomer; and about 2 methoxy groups per terminal moiety. (Tradename: SF-1706) | Momentive Performance Materials ("Momentive") |

TABLE 1-continued

| Identifier | Description | Source |
|---|---|---|
| SO2 | A phenyl-containing siloxane fluid comprising polydimethylsiloxane having terminal methoxy groups; phenyl groups having about 50-55 weight percent of Si(Ph$_2$)O groups wherein "Ph" denotes a phenyl group; and a viscosity at 23° C. of 32-60 centistokes. (Tradename: SE 4029) | Momentive |
| SO3 | A high viscous silicone fluid comprising a silanol stopped methylsiloxane polymer silicone base. (Tradename: SFR-100) | Momentive |

Figure 2:
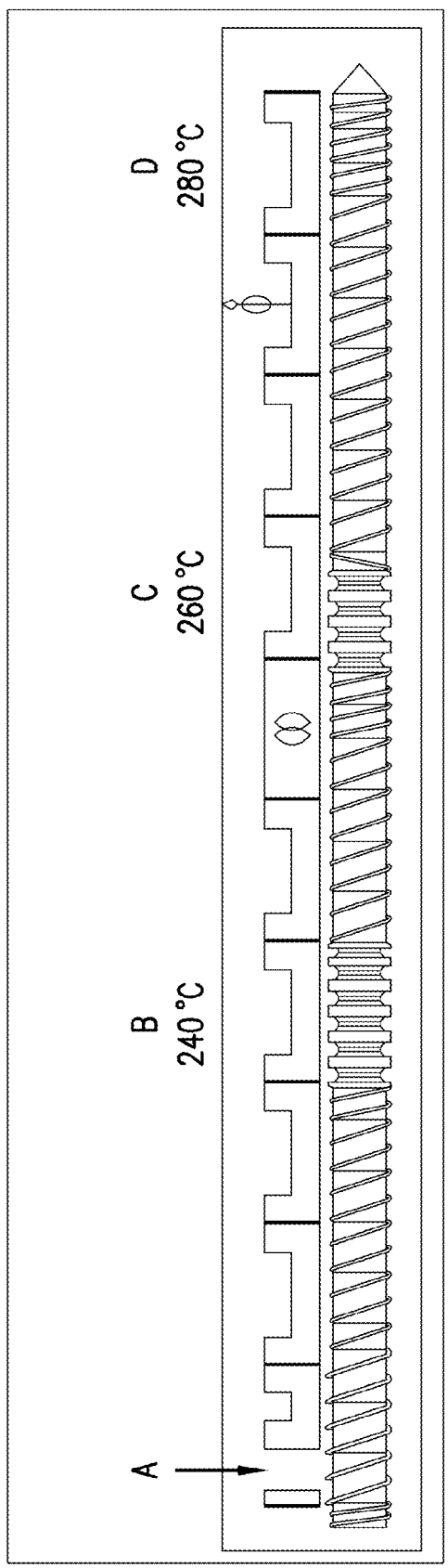
FIG. 2 shows a representative temperature profile with the screw design used in compounding.

Molded articles were prepared for analysis as described herein, and in FIG. 1 (compounding set-up) and FIG. 2 (temperature profile with screw design). FIG. 1 includes (100) a motor, (120) a gear box, (130) a vibrator feeder, (140) an extruder, (150) a die hard, (160) a vacuum pump, (170) strands, (180) a water bath, and (190) a pelletizer. FIG. 2 shows the temperature at point B is 240° C., at point C is 260° C., and at point D is 280° C. The raw materials for sample batches were weighted and mixed in a high-speed mixer at about 1000-3000 rpm for about 120 sec. prepared by pre-blending all constituents in a dry-blend and tumble mixing for about 4-6 minutes. All samples were prepared by melt extrusion by feeding the pre-blend into a W&P ZSK2 Twin Screw Extruder with co-rotating twin screw (25 mm) with a 10-barrel set-up and a length to diameter ratio of 40, using a barrel temperature of about 260° C. to about 280° C., and a screw speed kept at about 300 rpm with the torque value maintained from about 50% to about 60%, and operated under standard processing conditions well known to one skilled in the art. After extrusion, the pellets were dried at about 100° C. for a minimum time of four hours prior to molding test samples. The molding process was carried out with a temperature profile of 260° C.-280° C. with an injection speed of about 5-70 mm/min and an injection pressure of about 60-70 bar, with the mold temperature maintained at 80° C.

Heat deflection temperature was determined per ISO 75 with flatwise specimen orientation with specimen dimensions of 80 mm×10 mm×4 mm. Data were collected using a Ceast HDT VICAT instrument and are provided below in units of ° C.

The notched Izod impact ("NII") test was carried out on 80 mm×10 mm×4 mm molded samples (bars) according to ISO180 at 23° C. Test samples were conditioned in ASTM standard conditions of 23° C. and 55% relative humidity for 48 hours and then were evaluated. NII was determined using a Ceast Impact Tester.

Flexural properties (modulus and strength) were measured using 3.2 mm bars in accordance with ISO 178. Flexural strength (in units of MPa) and flexural modulus (in units of GPa) are reported at yield.

Melt volume-flow rate ("MVR") was determined according to standard ISO 1133 under the following test conditions: 300° C./1.2 kg load/1080 sec dwell time. Data below are provided for MVR in cm$^3$/10 min.

Tensile properties (modulus, strength, and strength at yield) were measured on 3.2 mm bars in accordance with ISO 527 using sample bars prepared in accordance with ISO 3167 Type 1A multipurpose specimen standards. Tensile strength (for either at break or at yield, in units of MPa), tensile modulus (ion units of GPa), and tensile elongation (%) are reported at break.

Laser Direct Structuring Formulations Comprising Silane and Siloxane Materials

Figure 3:
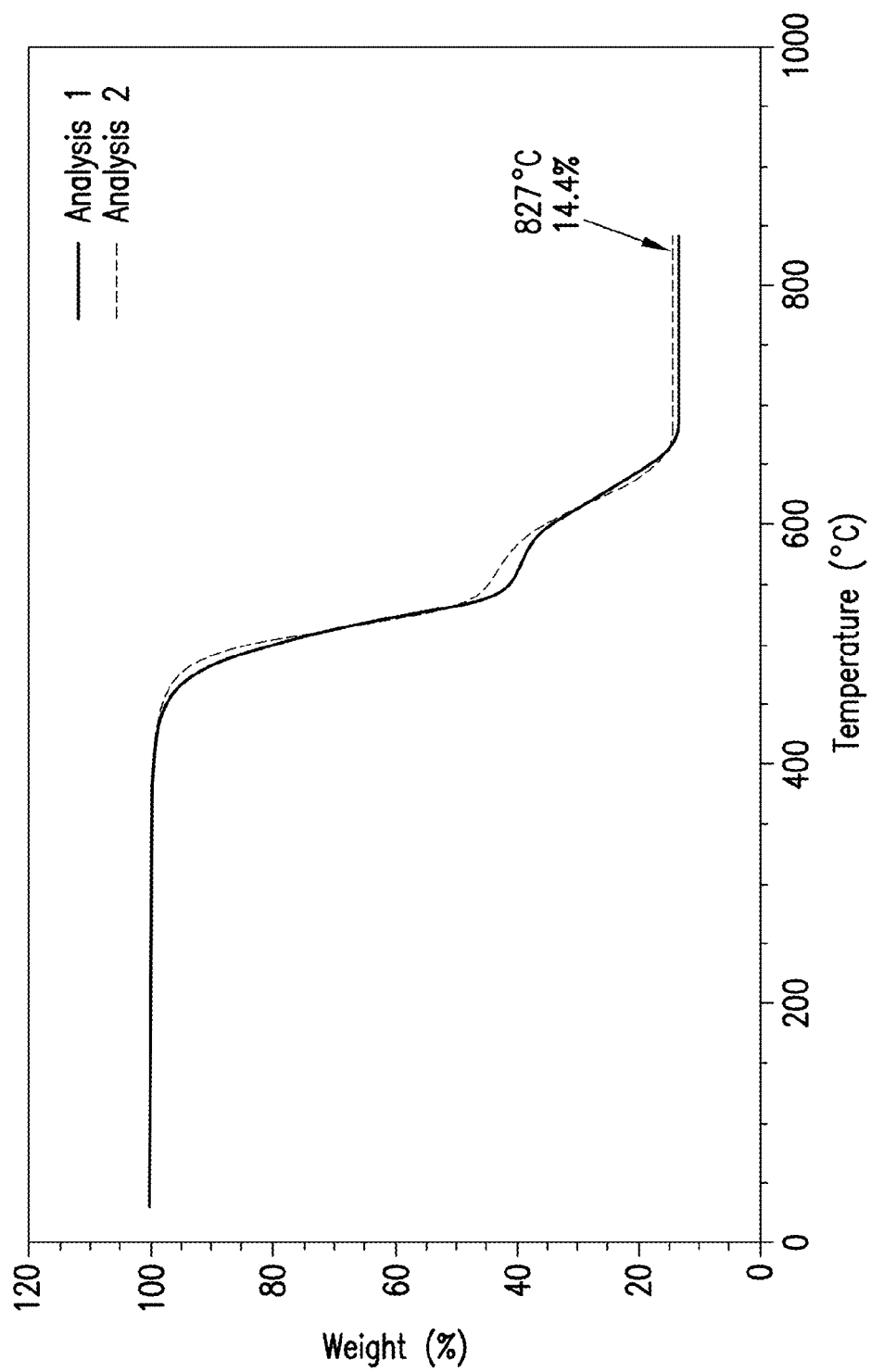
FIG. 3 shows representative thermogravimetric analysis of a comparator formulation.

The control or comparator formulation (Comp. 1) was prepared with the components and amounts described in Table 2, and the baseline properties for this comparator formulation are shown in Table 3. The black copper chromium oxide spinel used in Comp. 1 was analyzed by x-ray photoelectron spectroscopy ("XPS"), and it was found to comprise oxides of chromium ($Cr_2O_3$, $Cr_2O_4^{2-}$, and $Cr_2O_7^{2-}$), and copper (CuO). Thermogravimetric analysis was also carried out (TA Instruments, Inc.) on Comp. 1, comparing two different preparations of the formulation. The data is shown in FIG. 3, and they show that data results are reproducible. In addition, the data show that about 14 wt % of the sample analyzed is attributable to inorganic fillers, which is consistent with the formulation shown in Table 2 (i.e. the inorganic components were as follows: LDS1 was added at 10 wt % and FIL was added at 3 wt %).

TABLE 2*

| No. | Item | Comp.1 | Sample 1** | Sample 2*** | Sample 3 | Sample 4 |
|---|---|---|---|---|---|---|
| 1 | PC1 | 9.57 | 9.57 | 9.57 | 9.57 | 9.57 |
| 2 | PC2 | 5.22 | 5.22 | 5.22 | 5.22 | 5.22 |
| 3 | PC/PS | 72.2 | 72.2 | 72.2 | 72.2 | 72.2 |
| 4 | PETS | 0.30 | 0.30 | 0.30 | 0.30 | 0.30 |
| 5 | LDS1 | 10 | 10 | 10 | 10 | 10 |
| 6 | LDS2 | — | — | — | — | — |
| 7 | AO1 | 0.04 | 0.04 | 0.04 | 0.04 | 0.04 |
| 8 | AO2 | 0.10 | 0.10 | 0.10 | 0.10 | 0.10 |
| 9 | AO3 | 0.05 | 0.05 | 0.05 | 0.05 | 0.05 |
| 10 | ZI | 0.10 | 0.10 | 0.10 | 0.10 | 0.10 |
| 11 | FIL | 3.00 | 3.00 | 3.00 | 3.00 | 3.00 |
| 12 | PA | 0.03 | 0.03 | 0.03 | 0.03 | 0.03 |
| 13 | PAE | 0.06 | 0.06 | 0.06 | 0.06 | 0.06 |
| 14 | SO1 | — | — | — | 2 | — |
| 15 | SO2 | — | — | — | — | 2 |
| 16 | SO3 | — | — | — | — | — |
| | Total | 100 | 102** | 102*** | 102 | 102 |

*Amounts provided in terms of percent of total composition (by weight).
**2 wt % epoxysilane added to LDS1 ex situ as described in text.
***2 wt % aminosilane added to LDS1 ex situ as described in text.

TABLE 3*

Figure 4:
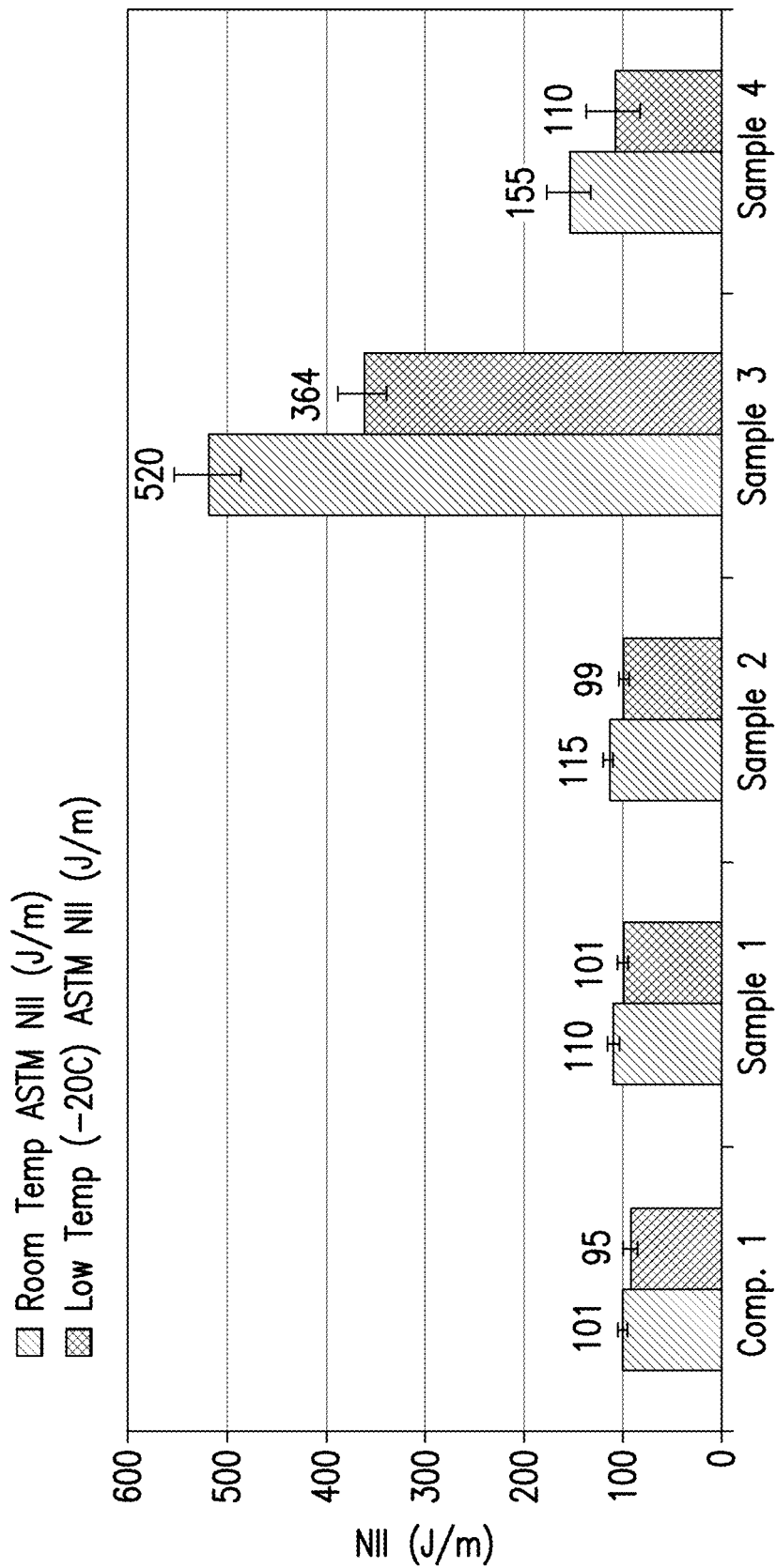
FIG. 4 shows representative Notched Izod Impact strength for representative disclosed compositions determined at room and sub zero (−23° C.) temperatures.

| No. | Test Detail | Units | Comp. 1 | Sample 1 | Sample 2 | Sample 3 | Sample 4 |
|---|---|---|---|---|---|---|---|
| 1 | HDT | ° C. | 117 | 115 | 115 | 113 | 112 |
| 3 | NII | J/m | | | See Figure 4 | | |

TABLE 3*-continued

| No. | Test Detail | Units | Comp. 1 | Sample 1 | Sample 2 | Sample 3 | Sample 4 |
|---|---|---|---|---|---|---|---|
| 4 | Tensile Strength (at break) | MPa | 45 | 44 | 44 | 41 | 42 |
|   | Tensile Strength (at yield) | MPa | 56 | | | | |
|   | Tensile Modulus | GPa | 2.5 | | | | |
|   | Elongation at break | % | 18 | 10 | 13 | 13 | 12 |
| 5 | Flexural Strength | MPa | 89 | 89 | 87 | 79 | 85 |
|   | Flexural Modulus | GPa | 2.5 | 2.5 | 2.4 | 2.1 | 2.1 |

In order to improve upon the NII strength of the Comp. 1 formulation, the effect of incorporating an additive treatment of the Cu—Cr spinel (LDS1) was tested (Samples 1-4). Both ex situ and in situ treatment of the Cu—Cr spinel was assessed. Briefly, the ex situ treatment comprised treating the Cu—Cr spinel (LDS1) with either 2 wt % of an epoxysilane (wt % based on the total weight of all components except epoxysilane; Sample 1) or 2 wt % of an aminosilane (wt % based on the total weight of all components except epoxysilane; Sample 1). The treated Cu—Cr spinel was then used in the formulation described in Table 2, which was then fed into the extruder as described previously for the preparation of the samples. Alternatively, rather than using the additive to treat separately the Cu—Cr spinel, it was included directly in the formulation composition and fed directly into the extruder as described previously to prepare Samples 3 and 4 per the formulation described in Table 2. The data in Table 3 and FIG. 4 shows that the treatment the nature of the additive (epoxysilane or aminosilane used in ex situ treatment, or alternatively, SO1 or SO2 used for in situ treatment) appeared to affect the mechanical and thermal properties tested. However, the exception noted was that in situ treatment using both SO1 and SO2 improved NII strength when tested at both 23° C. and at −20° C. as shown in FIG. 4. The in situ treatment with SO1 improved NII strength by over 500% for NII strength at 23° C. and over 350% for NII strength at −20° C. FIG. 4 shows the NII plotted with the actual values indicated numerically over each bar.

The chemical structure of SO1 is shown below:

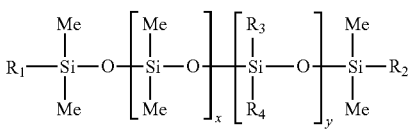

X:Y = 50:1
R1 and R2 - Terminal OME    R4 - Octyl chain

R3 - 

Compositions were also prepared replacing SO1 with aminosilanes such as (3-aminopropyl)trimethoxysilane (Tradename: A1100; available from GE Advanced Materials) and N-(2-aminoethyl)-3-aminopropyltrimethoxysilane (Tradename: A1120; available from GE Advanced Materials), which have the following structures:

(A1100)

 and (A1120)

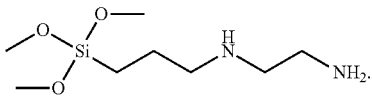

However, the use of these types of aminosilanes did not show any improvement in NII strength. Moreover, substitution of a these types of aminosilanes for a siloxane such as SO1 resulted degradation of the polycarbonate component during extrusion processing.

Laser Direct Structuring Formulations Comprising an Amino Siloxane Material

Figure 5:
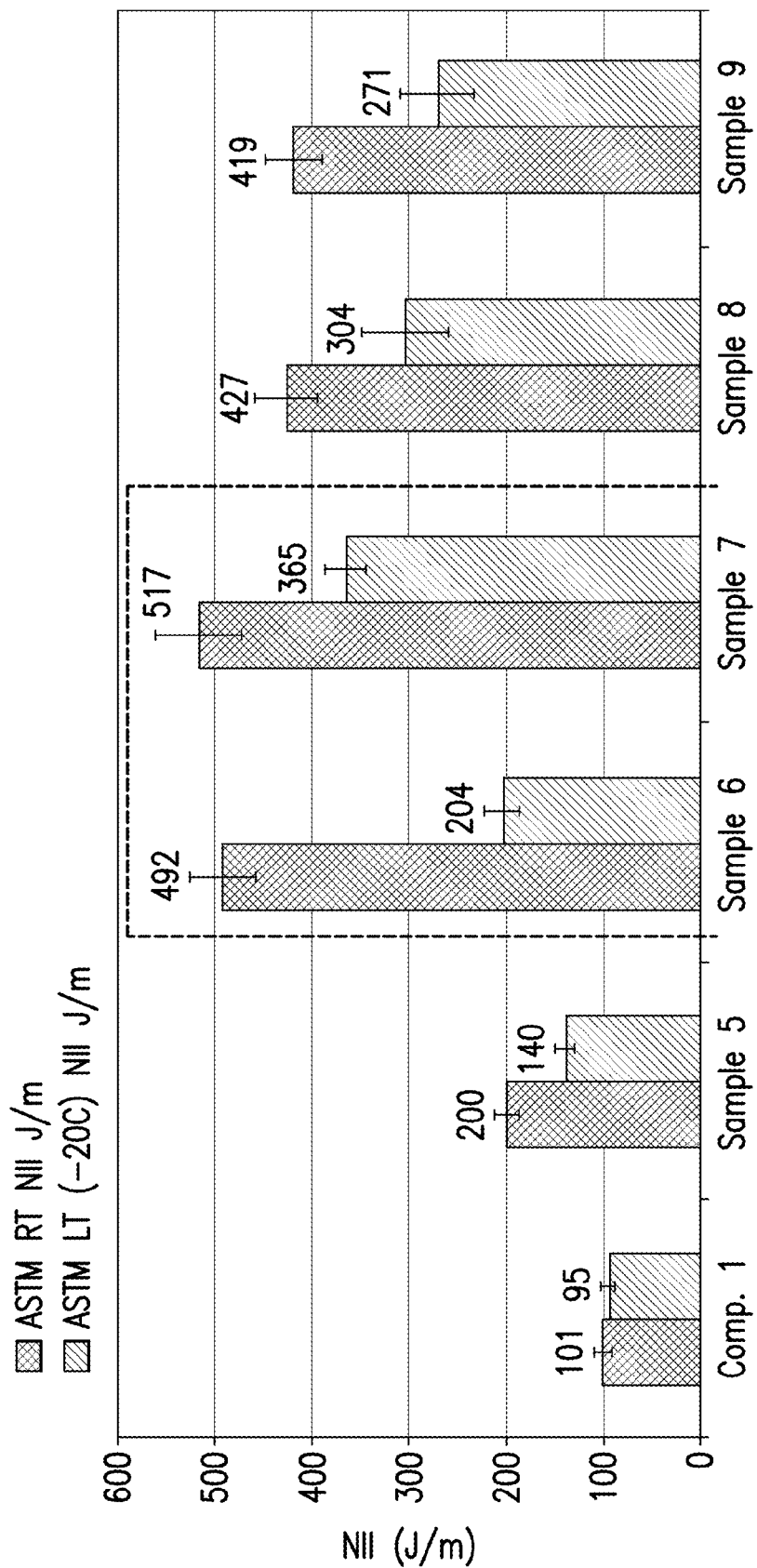
FIG. 5 shows representative Notched Izod Impact strength for representative disclosed compositions determined at room and sub zero (−23° C.) temperatures.

The effect of varying the wt % content of an additive was assessed. The comparator and sample formulations examined are described in Table 4. The data in FIG. 5 show a positive correlation between wt % content of the additive, SO1, and NII strength up to about 2 wt %, with a modest decrease observed at higher wt %. Nevertheless, in the range of 0.5 wt %-4 wt %, the NII strength showed at least about a 200% increase at 23° C. and at least about a 40% increase at −20° C. The maximal increase was observed between about 1 wt % to about 2 wt % of SO1, and the data show in the this wt % range for SO1 that the NII strength increased about 490% to about 520% at 23° C. and about 200% to about 370% at −20° C., wherein the lower value is the result obtained at 1 wt % and the upper value is the result obtained at 2 wt %.

TABLE 4*

| No. | Item | Comp.1 | Sample 5 | Sample 6 | Sample 7 | Sample 8 | Sample 9 |
|---|---|---|---|---|---|---|---|
| 1 | PC1 | 9.57 | 9.57 | 9.57 | 9.57 | 9.57 | 9.57 |
| 2 | PC2 | 5.22 | 5.22 | 5.22 | 5.22 | 5.22 | 5.22 |
| 3 | PC/PS | 72.2 | 72.2 | 72.2 | 72.2 | 72.2 | 72.2 |
| 4 | PETS | 0.30 | 0.30 | 0.30 | 0.30 | 0.30 | 0.30 |
| 5 | LDS1 | 10 | 10 | 10 | 10 | 10 | 10 |
| 6 | LDS2 | — | — | — | — | — | — |
| 7 | AO1 | 0.04 | 0.04 | 0.04 | 0.04 | 0.04 | 0.04 |
| 8 | AO2 | 0.10 | 0.10 | 0.10 | 0.10 | 0.10 | 0.10 |
| 9 | AO3 | 0.05 | 0.05 | 0.05 | 0.05 | 0.05 | 0.05 |
| 10 | ZI | 0.10 | 0.10 | 0.10 | 0.10 | 0.10 | 0.10 |
| 11 | FIL | 3.00 | 3.00 | 3.00 | 3.00 | 3.00 | 3.00 |
| 12 | PA | 0.03 | 0.03 | 0.03 | 0.03 | 0.03 | 0.03 |
| 13 | PAE | 0.06 | 0.06 | 0.06 | 0.06 | 0.06 | 0.06 |
| 14 | SO1 | — | 0.5 | 1.0 | 2.0 | 3.0 | 4.0 |
| 15 | SO2 | — | — | — | — | — | 2 |
| 16 | SO3 | — | — | — | — | — | — |
| | Total | 100 | 100.5 | 101 | 102 | 103 | 104 |

*Amounts provided in terms of percent of total composition (by weight).

Interaction Between Cu Cr Spinel and Amino Siloxane Material

Without wishing to be bound by a particular theory, a siloxane additive such as an aminosiloxane (e.g. including, but not limited to, SO1) can form a —Si—O-M bond (wherein M represents a metal atom) between the Cu—Cr spinel (or other laser direct structuring filler, generally a mixed metal oxide spinel). Under the conditions that extrusion occurred, the —OCH$_3$ group of the aminosiloxane can hydrolyze to a —OH group. Again, without wishing to be bound by a particular theory, a —OH group can potentially react with surface functionalities of the laser direct structuring filler, e.g. the Cu—Cr spinel used in the studies described herein. The potential reactive functionalities of a laser direct structuring filler include, but are not limited to, —OH groups or alternatively -MO (metal oxide) groups.

Figure 6:
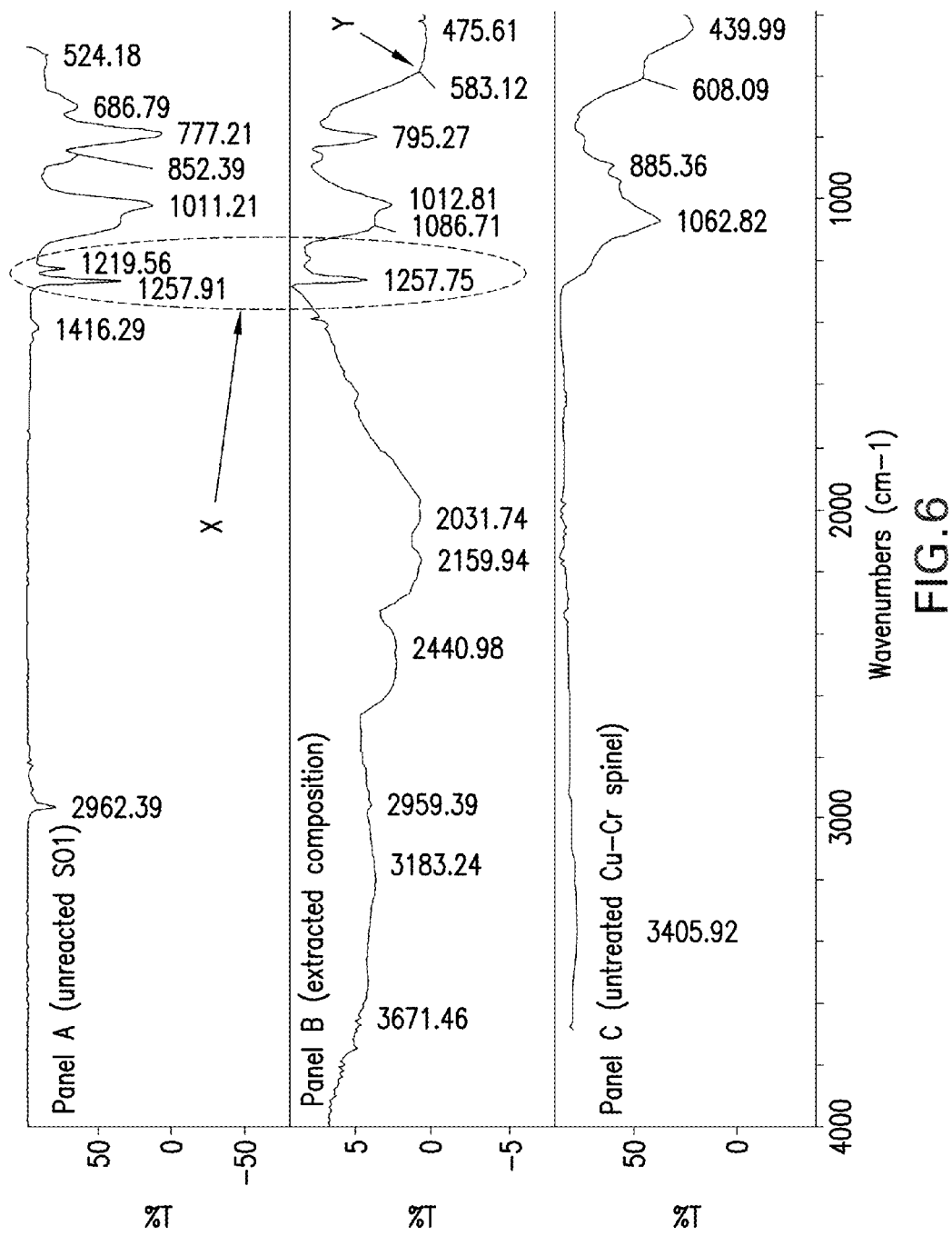
FIG. 6 shows representative FTIR data for a representative disclosed composition compared to untreated component materials. Panel A shows a FTIR for the unreacted SOI. The dotted line shows a peak consistent with chemical bond formation with metal oxide. Panel B shows an extracted composition. In Panel B, the arrow shows a peak consistent with the M—O bond of metal oxide. Panel C shows a FTIR for untreated Cu—Cr spinel.

A model composition comparable to Sample 7 was prepared, and then extracted to remove unreacted SO1. Extraction was carried out using a Soxhlet extractor, followed by washing and then drying. The cycle of extraction, washing, and drying was repeated multiple times. The remaining sample was analyzed by Fourier Transform Infrared ("FTIR") spectroscopy. The FTIR data for the unreacted SO1 alone (Panel A), extracted sample (Panel B), and untreated Cu—Cr spinel (Panel C) are shown in FIG. 6. The data show the presence of a Si—CH$_3$ peak (about 1258 cm$^{-1}$) from chemically bound and/or absorbed SO1 in the extracted sample (Panel B). The presence of this FTIR peak can be explained by chemical bond formation between the Cu—Cr spinel and the aminosiloxane, SO1. The data are consistent with possible chemical reaction between one or more surface moieties of the Cu—Cr spinel and the aminosiloxane.

Figure 7A:
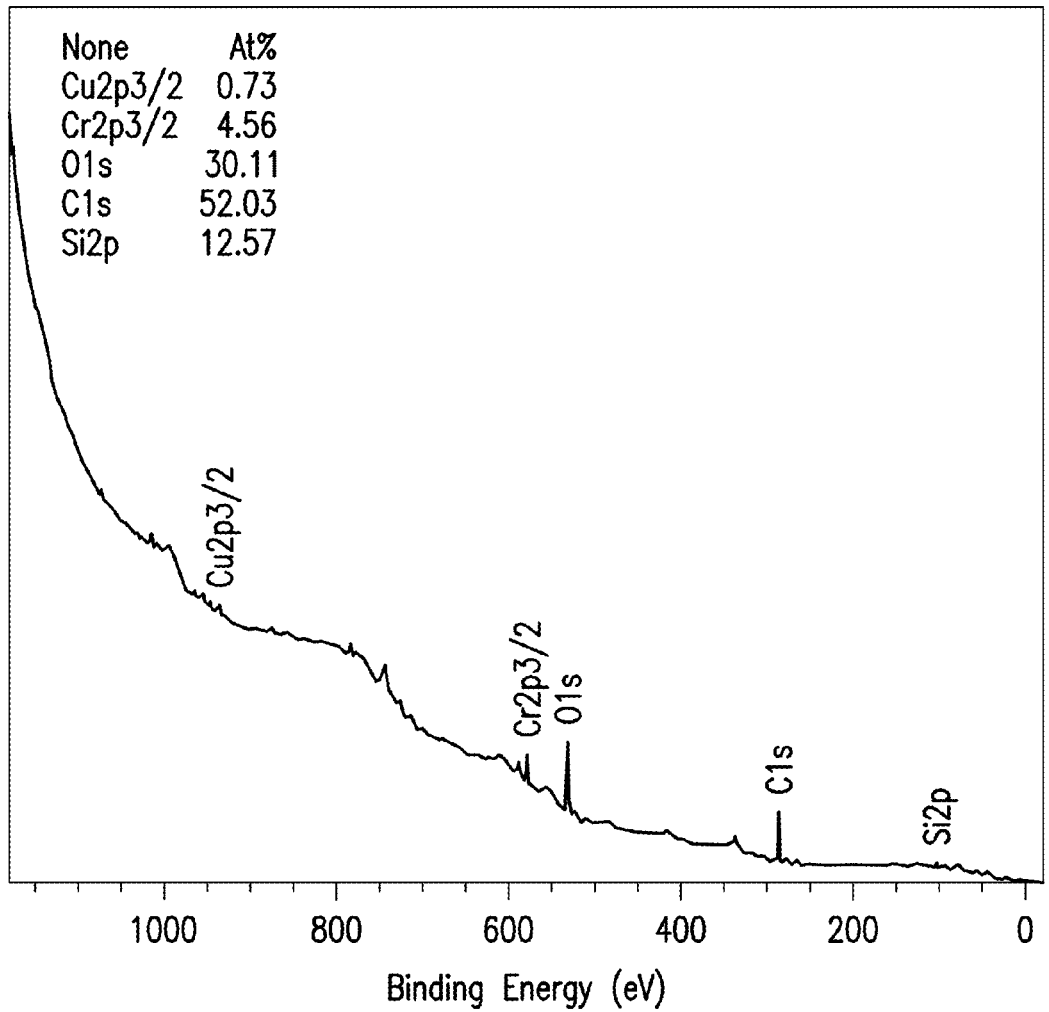
FIGS. 7A, 7B, and 7C show representative X-ray photoelectron data for untreated Cu—Cr spinel compared to a representative Cu—Cr spinel surface treated with a siloxane material. Specifically.
Figure 7B:
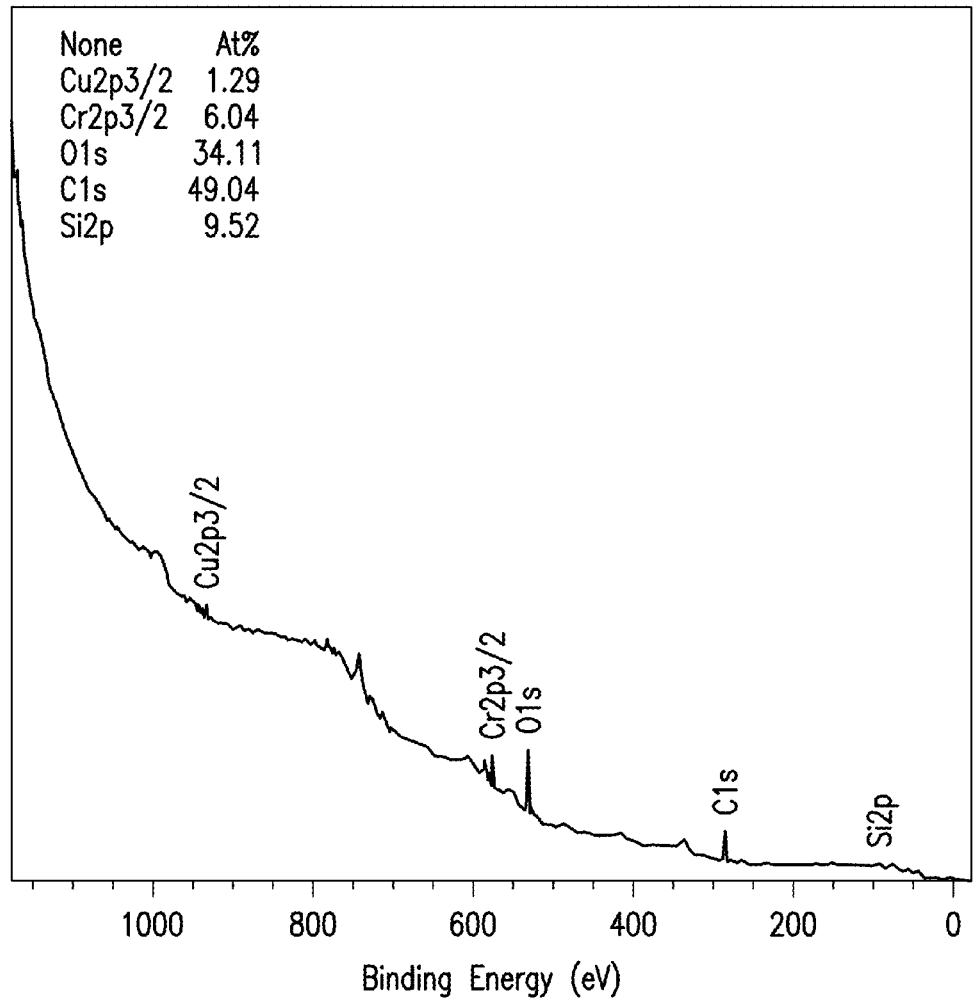
Figure 7C:
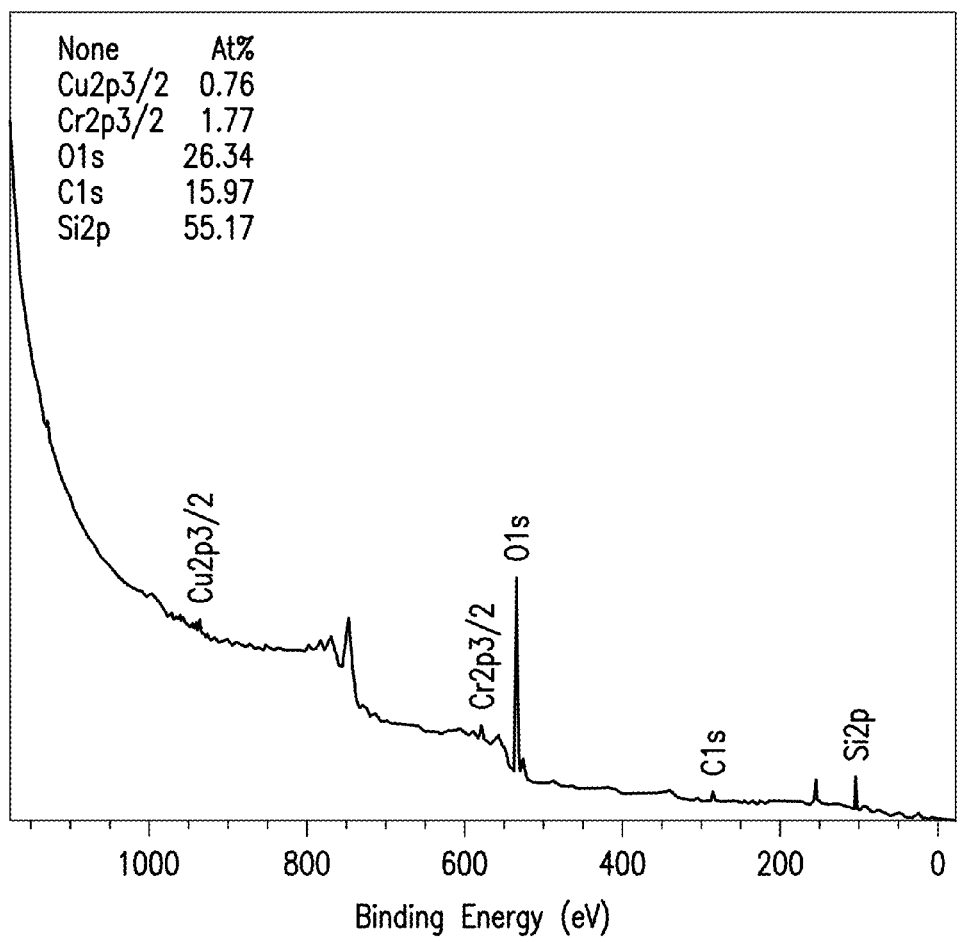

XPS were carried out on unreacted (or pristine) Cu—Cr spinel and with Cu—Cr spinel samples that had been surface treated with SO1. The XPS data are shown in Table 5 and FIG. 7 (see FIGS. 7A, 7B, and 7C, which are respectively, XPS spectrographs for untreated Cu—Cr1 spinel/Lot 1, untreated Cu—Cr1 spinel/Lot 2, and Cu—Cr spinel-surface treated with SO1). In this study, peaks were assigned with respect to $C_{1s}$ at 285 eV (binding energy). XPS study reveals the presence of oxides of Cr ($Cr_2O_3/Cr_2O_4^{2-}/Cr_2O_7^{2-}$), and Cu (CuO) from various photo electron peaks in pristine Cu—Cr Spinel 1. The data in Table 5 show an increase in atomic % of $Si_2p$ of Cu—Cr spinel surface-treated with aminosiloxane, SO1, evident as compared to two different lots of untreated Cu—Cr spinel. The presence of Si photoelectron peaks in the surface-treated CuCr spinel confirms presence of Si in the sample after Soxhlet extraction, washing and subsequent drying of sample, and is consistent with possible —Si—O-M, e.g. such as —Si—O—Cu bond formation. Moreover, the data show the presence of oxygenated species bound to carbon. The data—both the XPS study and the FTIR study—are consistent with the possible chemical reaction of the aminosiloxane, SO1, with the Cu—Cr spinel used in the study.

TABLE 5*

| Orbital | Cu—Cr Spinel (untreated, Lot 1) | Cu—Cr Spinel (untreated, Lot 2) | Cu—Cr Spinel (surface-treated with SO1) |
|---|---|---|---|
| $Cu_{2p3/2}$ | 0.79 | 1.29 | 0.76 |
| $Cr_{2p3/2}$ | 4.56 | 6.04 | 1.77 |
| $O_{1s}$ | 30.11 | 34.11 | 26.3.4 |
| $C_{1s}$ | 52.03 | 49.04 | 15.97 |
| $Si_{2p}$ | 12.57 | 9.52 | 55.17 |

*Values given are atomic % as determined by XPS.

Effect of Additive Treatment on Polycarbonate Degradation

Figure 8:
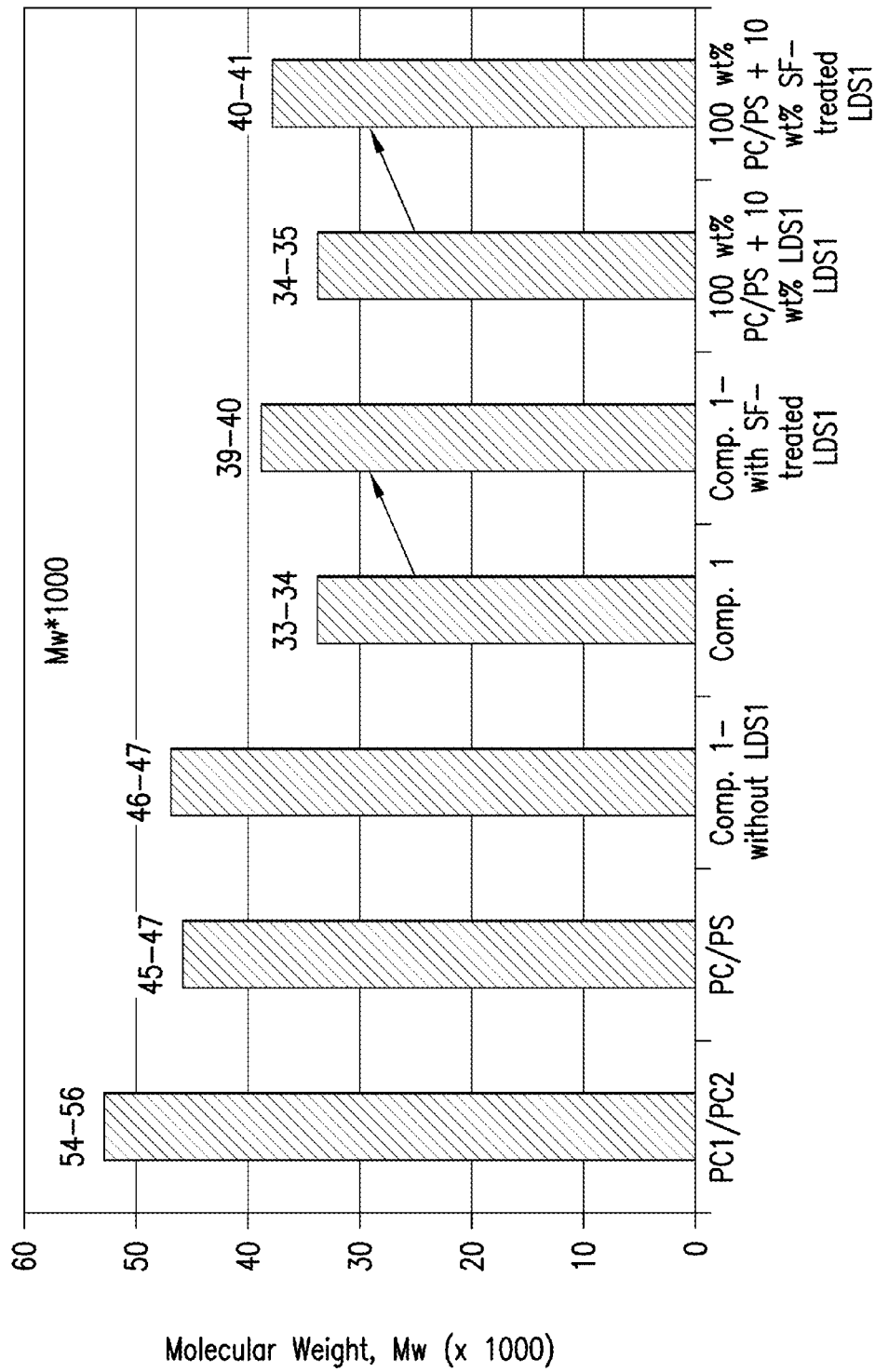
FIG. 8 shows representative molecular weight data for neat compositions, control compositions, and representative disclosed compositions. The arrows point to columns with SF-treated LDS1.

The presence of a laser direct structuring additive, e.g. Cu—Cr spinel, has a deleterious effect on the integrity of the polymers in the formulation, e.g. there is degradation of the size of polycarbonate polymers or polycarbonate-siloxane copolymers in the presence of laser direct structuring additives. The data discussed herein above indicates the addition of an additive such as SO1 increases the NII strength of the formulation. Determination of the Mw of polymer components (i.e. the polycarbonate, PC1 and PC2, and polycarbonate-siloxane, PC/PS) was determined in the presence of Cu—Cr spinel, both treated and untreated with SO1. The data are shown in FIG. 8. The Mw of the control formulation without the presence of Cu—Cr spinel (i.e. Comp. 1 formulation shown in Table 2, but without 10 wt % LDS1) shows a decrease in Mw when untreated Cu—Cr spinel is present. The addition of 2 wt % SO1 restores in part the Mw of the polymer component. Similar results were obtained (see FIG. 9) when the formulation comprised only PC/PS for the polymer component instead of a combination of PC1, PC2 and PC/PS. In FIG. 8, the following should be noted: "Control" comprises the same wt % of PC1, PC2, and PC/PS as shown in Table 1 for Comp. 1; "SF-treated LDS1" means that the Cu—Cr spinel LDS1 has been surface-treated with SO1; and "100 wt % PC/PS" is a formulation comprising only PC/PS with 10 wt % super addition of LDS1, either surface-treated ("SF" in the figure) with SO1 or not, as indicated in the figure.

Figure 9A:
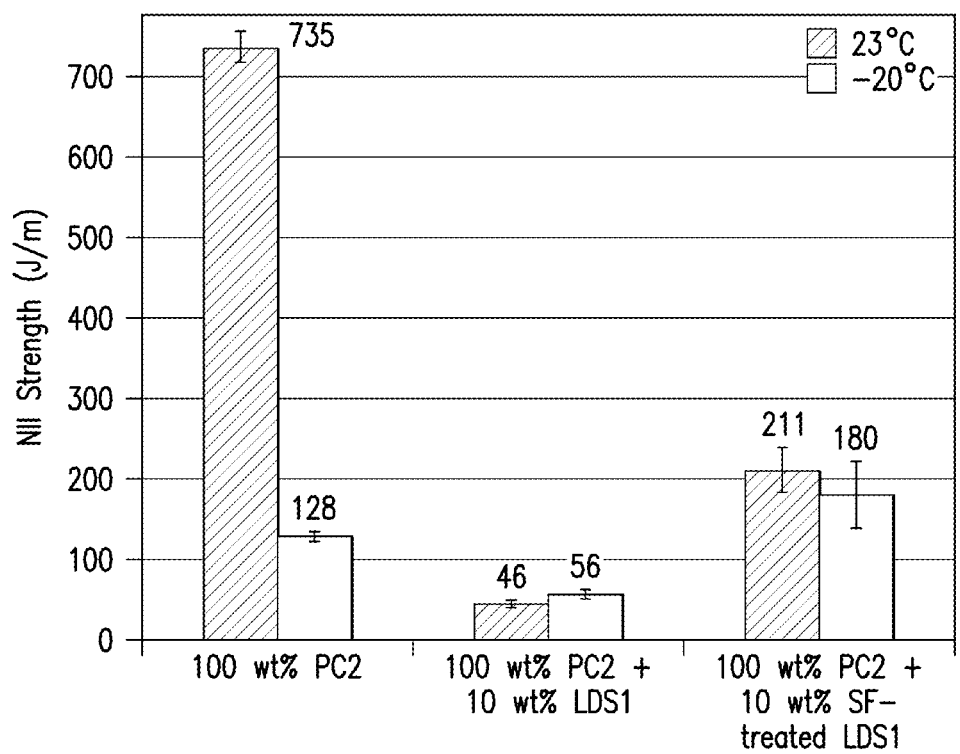
FIGS. 9A, 9B, and 9C show representative Notched Izod Impact data for various disclosed compositions.
Figure 9B:
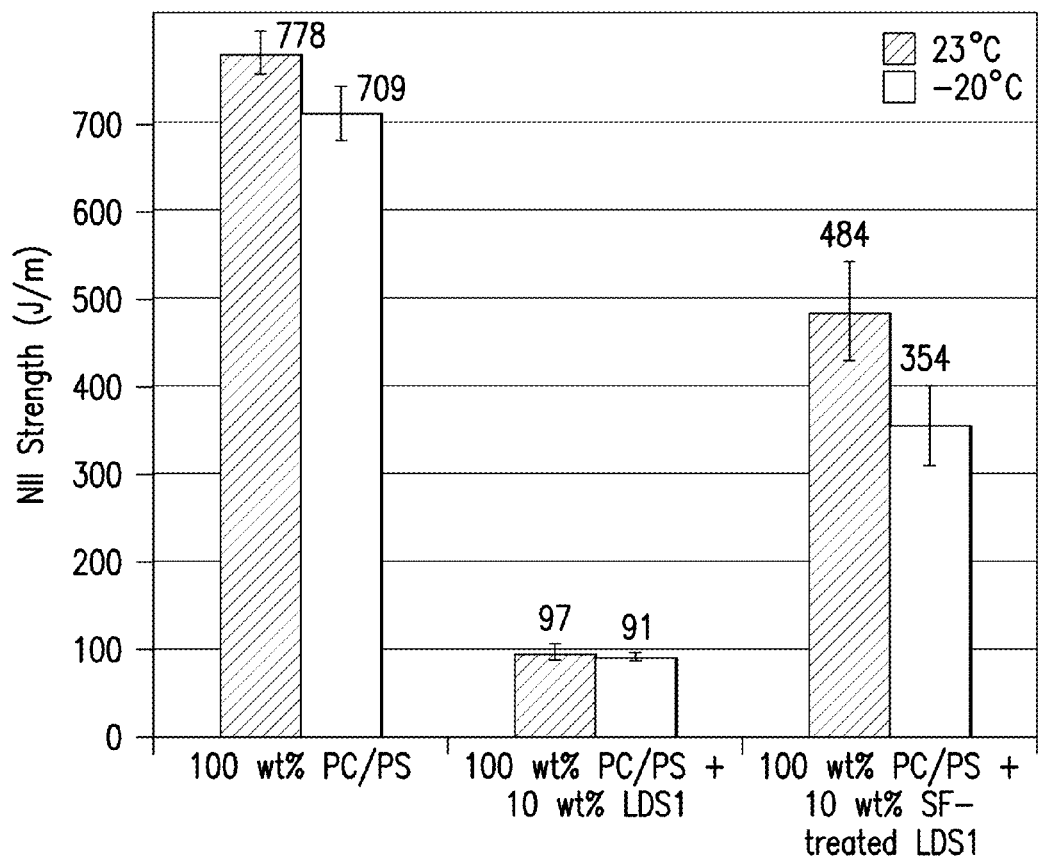
Figure 9C:
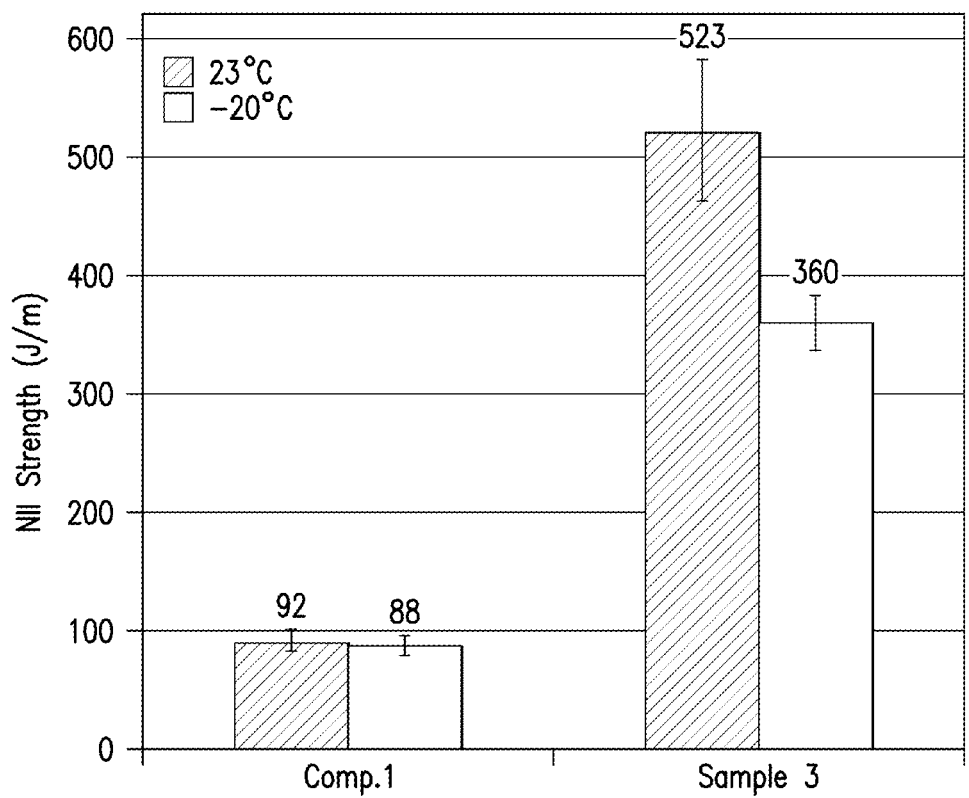

NII Strength in PC or PC/PS Compositions Comprising Treated Laser Directing Structuring Additive Compositions comprising 100 wt % of either PC2 or PC/PS have comparable Mw (about 40,000) and NII strength (about 700-800 J/m; see FIG. 9, Panel A for PC2 compositions and Panel B for PC/PS compositions). There is a dramatic decrease in NII strength for compositions comprising either PC2 or PC/PS only when a laser direct structuring additive such as LDS1 is added (super addition, 10 wt %), see FIGS. 9A and 9B. However, when the surface treated LDS (treated with SO1) is added to a neat composition comprising PC2, there is an increase in NII strength, but it is a partial recovery compared to a composition comprising neat PC2 without the presence of LDS1. For example, a neat composition of PC2 has a room temperature NII strength of about 730 J/m and a sub-zero NII of about 120 J/m. The use of a surface-treated LDS1 restores the NII strength to about 210 J/m at room temperature (or about 28% of the baseline value without any additional component in the neat PC2 composition). In contrast, the super addition of 10 wt % of a surface-treated LDS to a composition comprising 100 wt % PC/PS restores to more than 60% of the baseline NII strength value at room temperature and about 50% of the baseline NII strength value at a sub-zero temperature. The trend observed with the addition of surface-treated LDS1 is mirrored in the results obtained with the compositions described herein (see FIG. 9C which shows results for Comp. 1 compared to Sample 3).

Effect of Processing Method

Figure 10:
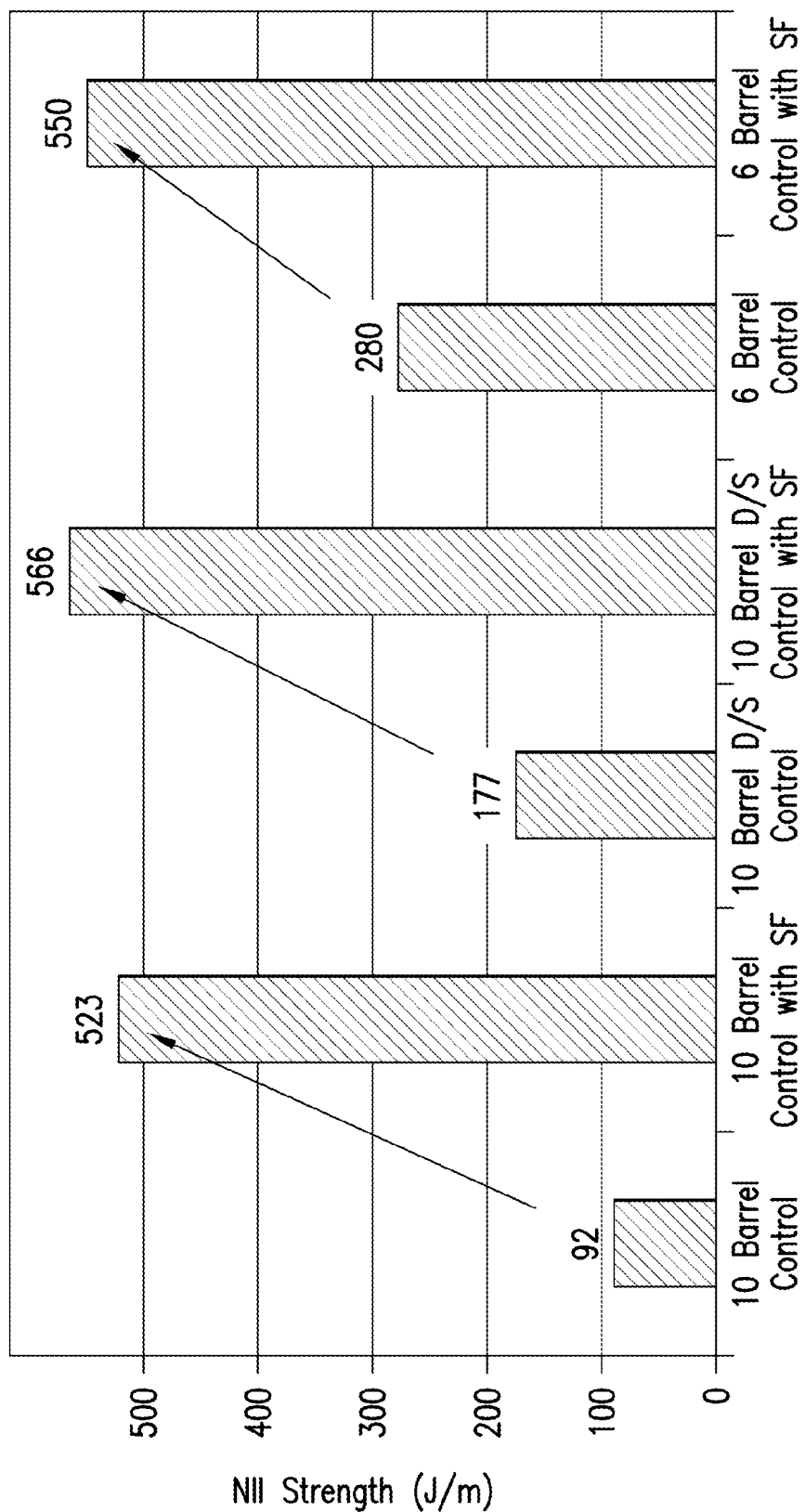
FIG. 10 shows representative Notched Izod Impact strength data for representative disclosed compositions processed under different representative conditions. The arrows point to columns of compositions treated with SF.

In the example compositions described herein above, the processing had occurred in a 10 barrel set up where all ingredients and additives and fillers were premixed and dumped in main feeder at barrel 1. When 1 to 2% SO1 was added to this composition, improvement in NII strength was observed (see data in FIGS. 4, 5 and 9). The effect of different processing conditions was assessed (viz., barrel setup, residence time and split feeding) and are described in Table 6. The data showing the effect of the varied processing conditions described in Table 6 on NII strength (23° C.) are shown in FIG. 10. The data in FIG. 10 show a similar trend for all processing conditions examined (as described in Table 6).

TABLE 6

| Processing Designation | Description |
|---|---|
| 10 Barrel control | In 10 barrel twin screw ( L/D = 41) extruder set up Control composition with 10 wt % untreated LDS1. |
| 10 Barrel with SF | In 10 barrel twin screw ( L/D = 41) extruder set up composition with 10 wt % LDS1 + surface treatment with 2 wt % SO1. |
| 10 Barrel D/S control | In 10 barrel twin screw ( L/D = 41) extruder set up Control composition with 10 wt % untreated LDS1. D/S = Down stream ( 10% LDS filler are added at the $6^{th}$ barrel of the 10 barrel extruder) |
| 10 Barrel D/S with SF | In 10 barrel twin screw ( L/D = 41) extruder set up 10 wt % LDS1 + surface treatment with 2 wt % SO1. D/S = Down stream ( 10% LDS filler are added at the $6^{th}$ barrel of the 10 barrel extruder) |
| 6 Barrel control | In 6 barrel twin screw ( L/D = 25) extruder set up (shorter) Control composition 10 wt % untreated LDS1. |
| 6 Barrel with SF | In 6 barrel twin screw ( L/D = 25) extruder set up (shorter) composition with 10 wt % LDS1 + surface treatment with 2 wt % SO1. |

Effect of LDS Filler Material

Figure 11:
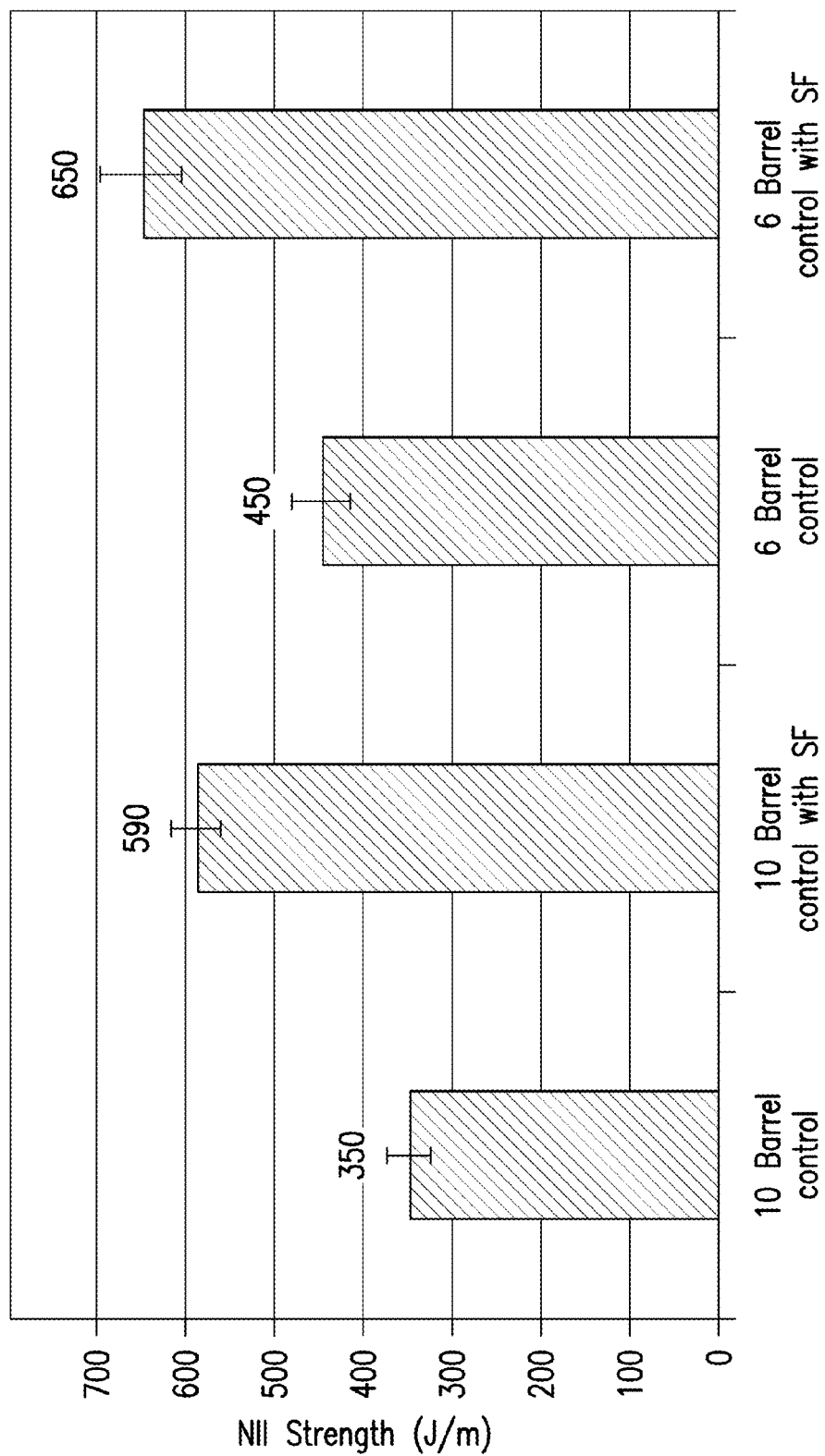
FIG. 11 shows representative Notched Izod Impact strength data for representative disclosed compositions processed under different representative conditions.
Figure 12:
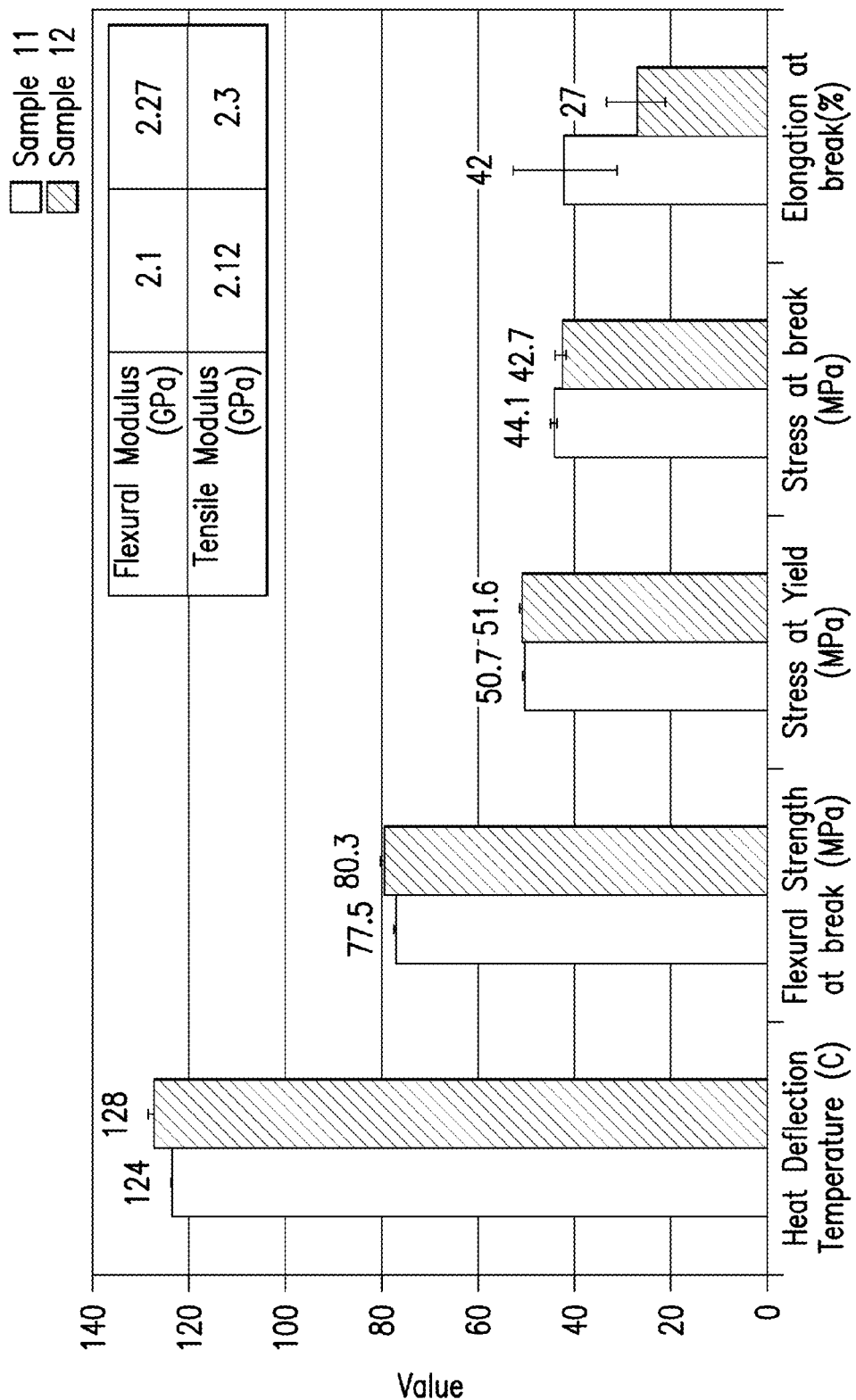
FIG. 12 shows representative thermal, flexural, and tensile properties for representative disclosed compositions. Sample 11 also has a flexural modulus of 2.1 GPa, while Sample 12 has a flexural modulus of 2.27 GPa. Sample 11 has a tensile modulus of 2.12 GPa, while Sample 12 has a tensile modulus of 2.3 GPa.

Similar compositions were prepared as described herein before, but using a different type of Cu—Cr spinel (LDS2). Representative comparator (no surface treatment additive such as SO1) and example samples (composition comprising a surface additive such as SO1) are shown in Table 7. The results are shown in FIG. 12 for NII strength (23° C.) with the Cu—Cr spinel (LDS2) when processed using both 10 barrel and 6 barrel (see Table 6 for description of relative processing conditions). The results show a similar trend as previously described herein for compositions comprising Cu—Cr spinel (LDS1) in the presence and absence of a surface treatment, e.g. SO1. It was also observed that a 6 barrel set-up had greater NII strength values (and similar results are shown in FIG. 11).

TABLE 7*

| No. | Item | Comp.2 | Sample 10 |
|---|---|---|---|
| 1 | PC1 | 9.57 | 9.57 |
| 2 | PC2 | 5.22 | 5.22 |
| 3 | PC/PS | 72.2 | 72.2 |
| 4 | PETS | 0.30 | 0.30 |
| 5 | LDS1 | — | — |
| 6 | LDS2 | — | 10 |
| 7 | AO1 | 0.04 | 0.04 |
| 8 | AO2 | 0.10 | 0.10 |
| 9 | AO3 | 0.05 | 0.05 |
| 10 | ZI | 0.10 | 0.10 |
| 11 | FIL | 3.00 | 3.00 |
| 12 | PA | 0.03 | 0.03 |
| 13 | PAE | 0.06 | 0.06 |
| 14 | SO1 | — | 2.0 |
| 15 | SO2 | — | — |
| 16 | SO3 | — | — |
| | Total | 100 | 100.5 |

*Amounts provided in terms of percent of total composition (by weight).

Comparison of Different Siloxane Additives

Figure 13:
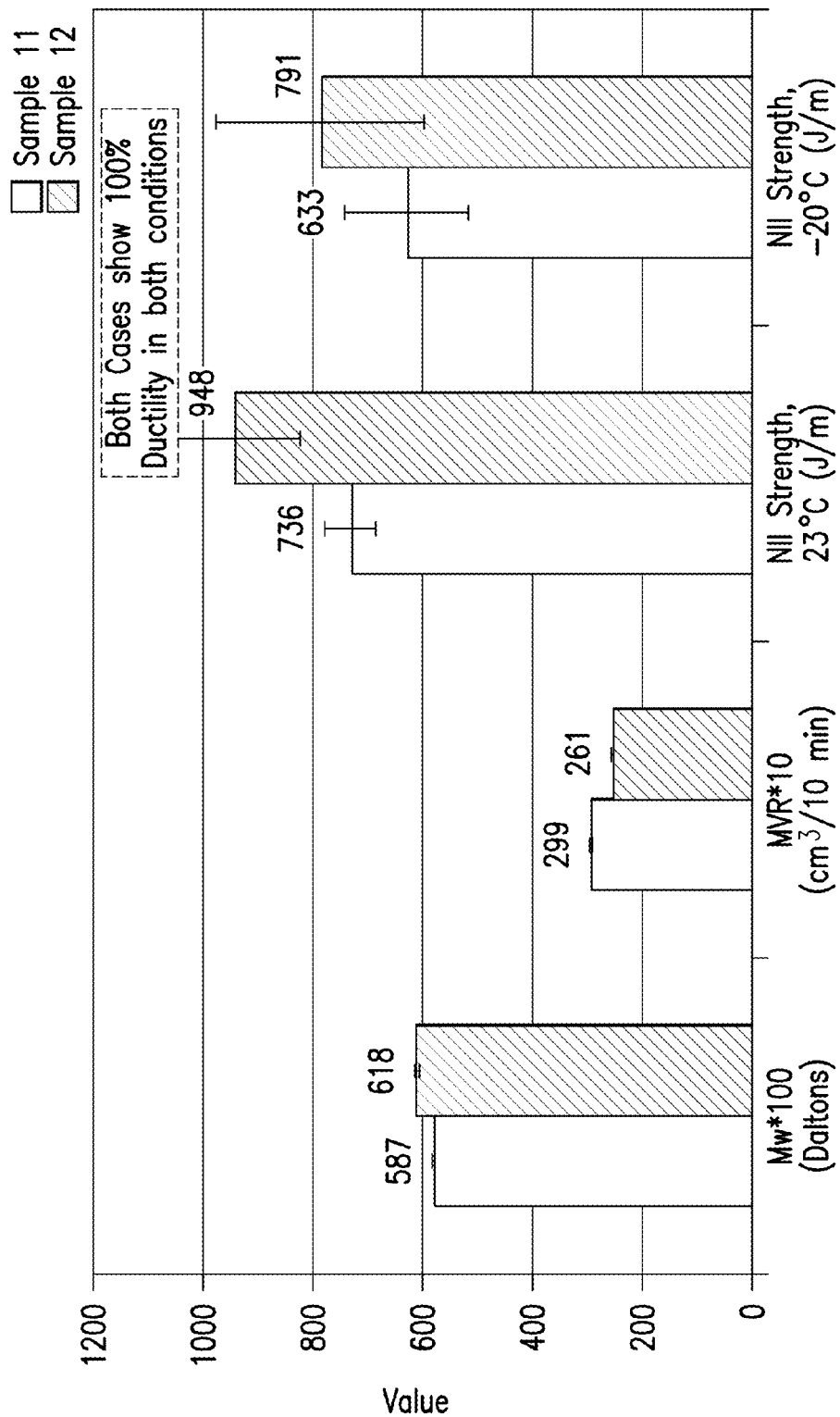
FIG. 13 shows representative melt flow rate, molecular weight, and Notched Izod Impact strength properties for representative disclosed compositions.

The siloxane additives SO1 (Tradename: SF-1076) and SO3 (Tradename: SFR-100) were directly compared to one another in a formulation comprising Cu—Cr spinel (LDS2). The formulation composition is described in Table 8. Mechanical and thermal properties for the two compositions are shown in FIGS. 12 and 13. The Y-axis in each figure do not have unit measurements associated, which are specified for the particular property for each pair of bar graphs below the X-axis. The date in FIG. 12 show that both Sample 11 and 12 displayed similar HDT, tensile properties, and flexural properties. In addition, both samples displayed similar retention of molecular weight when both SO1 and SO3 were used, and there was no apparent difference in MVR values under the test conditions used (FIG. 13). Room temperature (23° C.) and sub-zero temperature (−20° C.) NII strength test results (FIG. 13) show retention of 100% ductility under both conditions for compositions comprising either siloxane additives. The sample composition, Sample 12, comprising SO3 imparts comparatively more improvement in NII reaching a maximum value as high as almost 950 J/m as shown in FIG. 13 (with a higher standard deviation also) as compared to ~730 J/m for Sample 11 comprising SOI. Low temperature NII results show that both the additives are about equally good in retaining NII strength.

TABLE 8*

| No. | Item | Sample 11 | Sample 12 |
|---|---|---|---|
| 1 | PC3 | 53.43 | 53.43 |
| 2 | PC4 | 17.6 | 17.6 |
| 3 | PC/PS | 15 | 15 |
| 4 | PETS | 0.05 | 0.05 |
| 5 | LDS1 | — | — |
| 6 | LDS2 | 10 | 10 |
| 7 | AO1 | 0.1 | 0.1 |
| 8 | AO2 | 0.06 | 0.06 |
| 9 | AO3 | 0.1 | 0.1 |
| 10 | ZI | — | — |
| 11 | FIL | 3 | 3 |
| 12 | PA | — | — |
| 13 | PAE | — | — |
| 14 | SO1 | 2 | — |
| 15 | SO2 | — | — |
| 16 | SO3 | — | 2 |
| 17 | AO4 | 0.10 | 0.10 |
| 18 | UV1 | 0.12 | 0.12 |
| 19 | ZP | 0.1 | 0.1 |
| | Total | 100 | 100.5 |

*Amounts provided in terms of percent of total composition (by weight).

Comparison of Different Siloxane Additives

Representative disclosed compositions (Samples 6 and 7 formulations) were tested under end-use validation and compared to a comparator formulation (Comp. 1). The end-use validation comprised two steps:
  1. laser etching; and
  2. copper deposition (45 min per LPKF method). The plating index was calculated as follows:

It should be noted that a standard plating index of ≥0.7 is recommended in order to achieve good laser direct structuring processing following the two steps listed above. The Plating Index is calculated as follows:

$$\text{Plating Index} = \frac{\text{Average Cu thickness at a given parameter}^*}{\text{Average Cu thickness for reference sample at the same parameter}}$$

*Wattage and kHz of laser beam

Figure 14:
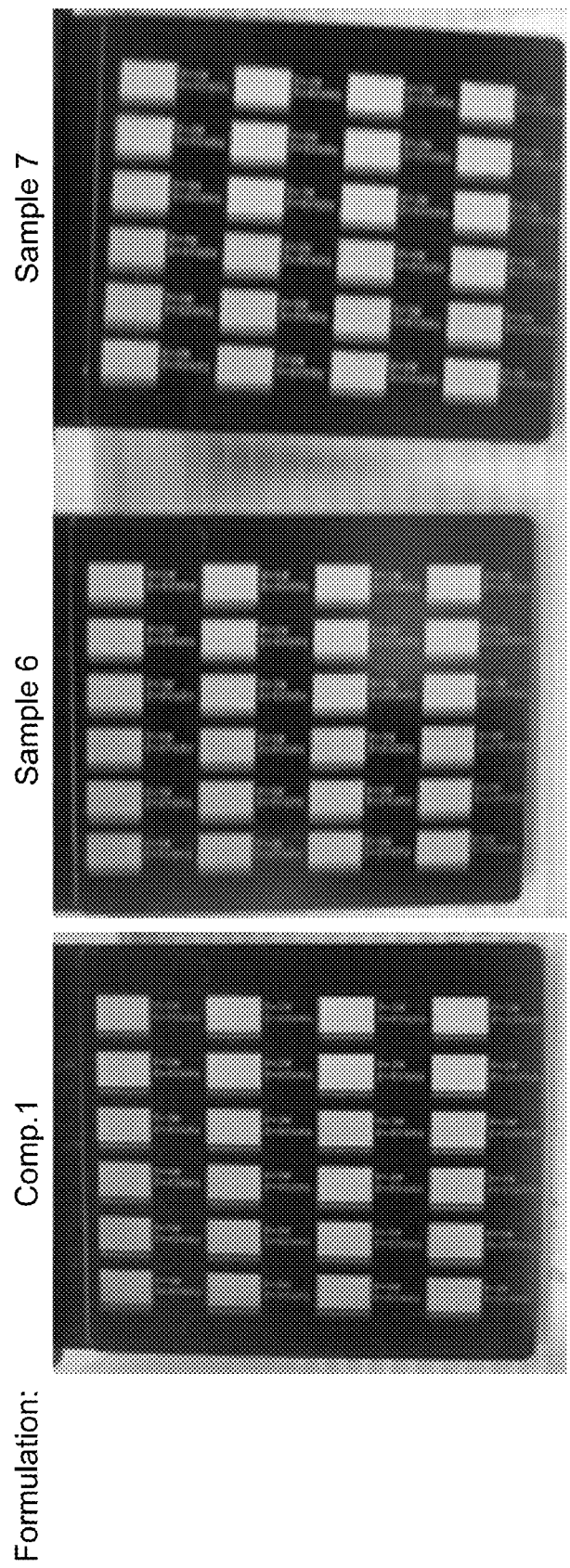
FIG. 14 shows representative plating data for screen of laser etching parameters (power and frequency) for representative disclosed compositions.

The data in Table 9 show the copper plating index results after the screening laser etching and copper plating for parameter screening, with images of the screening results shown in FIG. 14. That is, each cell in the table shows the plating index for a distinct parameter set (varying power, W, and frequency, kHz) in each cell. The data show that generally both samples provided good copper plating performance, with Sample 7 provided somewhat better copper plating performance.

TABLE 9

| Sample | Copper Plating Index | | | |
|---|---|---|---|---|
| Comp. 1 | 0.40 | 0.65 | 0.80 | 0.71 |
| Comp. 1 | 0.48 | 0.64 | 0.67 | 0.63 |
| Comp. 1 | 0.55 | 0.67 | 0.70 | 0.77 |
| Comp. 1 | 0.52 | 0.54 | 0.62 | 0.70 |
| Comp. 1 | 0.45 | 0.46 | 0.47 | 0.58 |
| Comp. 1 | 0.38 | 0.39 | 0.42 | 0.37 |
| Sample 6 | 0.51 | 0.66 | 0.69 | 0.71 |
| Sample 6 | 0.51 | 0.67 | 0.70 | 0.66 |
| Sample 6 | 0.61 | 0.72 | 0.82 | 0.79 |
| Sample 6 | 0.66 | 0.71 | 0.82 | 0.81 |
| Sample 6 | 0.58 | 0.70 | 0.79 | 0.78 |
| Sample 6 | 0.57 | 0.64 | 0.75 | 0.77 |
| Sample 7 | 0.73 | 0.69 | 0.73 | 0.65 |
| Sample 7 | 0.84 | 0.68 | 0.73 | 0.60 |
| Sample 7 | 0.85 | 0.84 | 0.83 | 0.82 |
| Sample 7 | 0.83 | 0.86 | 0.88 | 0.87 |
| Sample 7 | 0.77 | 0.82 | 0.87 | 0.88 |
| Sample 7 | 0.77 | 0.73 | 0.83 | 0.85 |

Based on the results of the parameter screen shown in Table 9 and FIG. 14, the four best parameters for each composition (W and kHz) were utilized for determination of laser strip plating and peel strength analysis. Peel strength is a measure of the resistance to peeling apart at a 90° angle and in these studies was measured in a table tope UTM machine. Higher strength correlates to better, more permanent plating onto the matrix of the molded part. As per the LPKF standard, a peel strength ≥0.7 is recommended in order to be utilized in laser direct structuring processing. The representative disclosed compositions (Samples 6 and 7) show improved adhesive peel strength compared to the comparator sample (Comp. 1) as shown by the data in Table 10.

TABLE 10

| Sample | Peel Strength Force (N/mm) |
|---|---|
| Comp. 1 | 0.725 |
| Comp. 1 | 0.771 |
| Comp. 1 | 0.740 |
| Comp. 1 | 0.807 |
| Comp. 1 | 0.748 |
| Comp. 1 | 0.221 |
| Comp. 1 | 0.265 |
| Sample 6 | 0.491 |
| Sample 6 | 0.617 |
| Sample 6 | 0.439 |
| Sample 6 | 1.018 |
| Sample 6 | 1.036 |
| Sample 6 | 1.031 |
| Sample 7 | 1.214 |
| Sample 7 | 1.321 |
| Sample 7 | 1.308 |
| Sample 7 | 1.255 |
| Sample 7 | 1.006 |
| Sample 7 | 1.021 |

TABLE 10-continued

| Sample | Peel Strength Force (N/mm) |
|---|---|
| Sample 7 | 1.039 |
| Sample 7 | 1.016 |

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thermoplastic composition comprising:
   a. a polycarbonate polymer;
   b. a polysiloxane-polycarbonate copolymer;
   c. a laser direct structuring additive; and
   d. a siloxane additive;

wherein a molded article having a thickness of 3.2 mm formed from the composition exhibits a notched izod impact energy that is at least 10% greater than that exhibited by a molded article formed from an identical reference composition in the absence of the siloxane additive.

2. The thermoplastic composition of claim 1, wherein the molded article formed from the composition exhibits a notched izod impact energy that is at least 100% greater than that exhibited by a molded article formed from an identical reference composition in the absence of the siloxane additive.

3. The thermoplastic composition of claim 1, wherein the molded article formed from the composition exhibits a notched izod impact energy that is at least 500% greater than that exhibited by a molded article formed from an identical reference composition in the absence of the siloxane additive.

4. The thermoplastic composition of claim 1, comprising:
   a. a bisphenol A polycarbonate polymer;
   b. a polysiloxane-polycarbonate block copolymer comprising diorganopolysiloxane blocks of the general formula (VII):

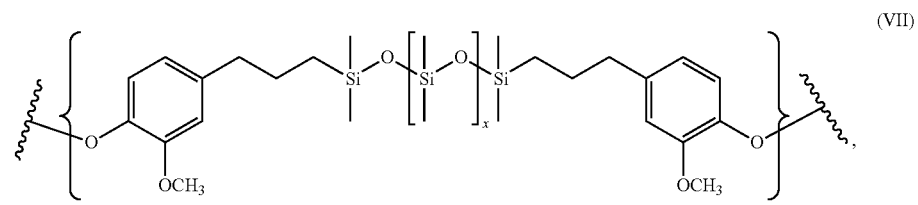

wherein x is from about 40 to about 60; and polycarbonate blocks are derived from bisphenol-A monomers;
wherein the diorganopolysiloxane blocks are randomly distributed in the polysiloxane-polycarbonate block copolymer;
wherein the siloxane content of the polysiloxane-polycarbonate block copolymer is about 20 wt %;
c. a laser direct structuring additive; and
d. an siloxane additive;
wherein the molded article formed from the composition exhibits a notched izod impact energy at 23° C. of at least 500 J/m and a notched izod impact energy at −23° C. of at least 300 J/m.

5. The thermoplastic composition of claim 4, wherein the bisphenol A polycarbonate polymer of a) comprises a blend of at least two different bisphenol A polycarbonates.

6. The thermoplastic composition of claim 4, wherein the molded article formed from the composition exhibits ductile failure mode as measured according to ASTM D256-2010.

7. The thermoplastic composition of claim 4, comprising:
a. from 5 weight % to 20 weight % bisphenol A polycarbonate relative to the total weight of the thermoplastic composition in the absence of the siloxane additive; and
b. from 50 to 80 weight % polysiloxane-polycarbonate copolymer relative to the total weight of the thermoplastic composition in the absence of the siloxane additive.

8. The thermoplastic composition of claim 4, wherein the laser direct structuring additive is present in the thermoplastic composition in an amount of from 5 weight % to 15 weight % relative to the total weight of the thermoplastic composition in the absence of the siloxane additive.

9. The thermoplastic composition of claim 4, wherein the laser direct structuring additive is selected from a heavy metal mixture oxide spinel, a copper salt, or a combination thereof.

10. The thermoplastic composition of claim 9, wherein the laser direct structuring additive comprises copper chromium oxide spinel.

11. The thermoplastic composition of claim 4, wherein the siloxane additive is present in a super addition amount in the range of from greater than 0 weight % to 5 weight %.

12. The thermoplastic composition of claim 4, wherein the siloxane additive is present in a super addition amount in the range of from 1 weight % to 3 weight %.

13. The thermoplastic composition of claim 4, wherein the siloxane additive comprises an amino siloxane.

14. The thermoplastic composition of claim 4, wherein the siloxane additive comprises a phenyl siloxane.

15. The thermoplastic composition of claim 4, further comprising one or more optional additives selected from an antioxidant, flame retardant, inorganic filler, and stabilizer.

16. A method for making a thermoplastic composition; comprising forming a blend composition comprising:
a. a polycarbonate polymer;
b. a polysiloxane-polycarbonate copolymer;
c. a laser direct structuring additive; and
d. a siloxane additive;

wherein a molded article having a thickness of 3.2 mm formed from the blend composition exhibits a notched izod impact energy that is at least 10% greater than that exhibited by a molded article formed from an identical reference blend composition in the absence of the siloxane additive.

17. The method of claim 16, wherein the molded article formed from the composition exhibits a notched izod impact energy that is at least 100% greater than that exhibited by a molded article formed from an identical reference composition in the absence of the siloxane additive.

18. The method of claim 16, wherein the molded article formed from the composition exhibits a notched izod impact energy that is at least 500% greater than that exhibited by a molded article formed from an identical reference composition in the absence of the siloxane additive.

19. The method of claim 16, wherein the formed blend composition comprises:
a. a bisphenol A polycarbonate polymer;
b. a polysiloxane-polycarbonate block copolymer comprising diorganopolysiloxane blocks of the general formula (VII):

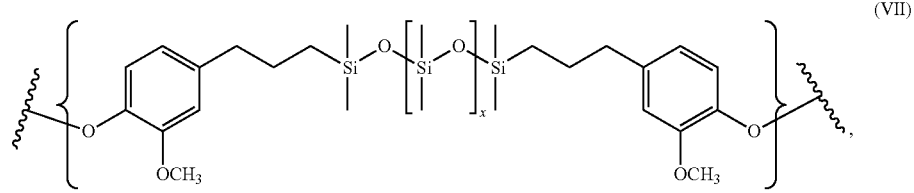

wherein x is from about 40 to about 60; and polycarbonate blocks are derived from bisphenol-A monomers;
wherein the diorganopolysiloxane blocks are randomly distributed in the polysiloxane-polycarbonate block copolymer;
wherein the siloxane content of the polysiloxane-polycarbonate block copolymer ranges from 4 mole % to 20 mole %;
c. a laser direct structuring additive; and
d. a siloxane additive;
wherein the molded article formed from the composition exhibits a notched izod impact energy at 23° C. of at least 500 J/m and a notched izod impact energy at −23° C. of at least 300 J/m.

20. The method of claim 19, wherein the bisphenol A polycarbonate polymer comprises a blend of at least two different bisphenol A polycarbonates.

21. The method of claim 19, wherein the molded article formed from the composition exhibits ductile failure mode according to ASTM D256-2010.

22. The method of claim 19, wherein the formed blend composition comprises:
a. from 5 weight % to 20 weight % bisphenol A polycarbonate relative to the total weight of the thermoplastic composition in the absence of the siloxane additive; and
b. from 50 to 80 weight % polysiloxane-polycarbonate copolymer relative to the total weight of the thermoplastic composition in the absence of the siloxane additive.

23. The method of claim 19, wherein the laser direct structuring additive is present in the formed blend composition in an amount of from 5 weight % to 15 weight % relative to the total weight of the thermoplastic composition in the absence of the siloxane additive.

24. The method of claim 19, wherein the laser direct structuring additive is selected from a heavy metal mixture oxide spinel, a copper salt, or a combination thereof.

25. The method of claim 19, wherein the laser direct structuring additive comprises copper chromium oxide spinel.

26. The method of claim 19, wherein the siloxane additive is present in the formed blend composition in a super addition amount in the range of from greater than 0 weight % to 5 weight %.

27. The method of claim 19, wherein the siloxane additive is present in the formed blend in a super addition amount in the range of from 1 weight % to 3 weight %.

28. The method of claim 19, wherein the siloxane additive comprises an amino siloxane.

29. The method of claim 19, wherein the siloxane additive comprises a phenyl siloxane.

30. The method of claim 19, wherein the blend composition further comprises one or more optional additives selected from an antioxidant, flame retardant, inorganic filler, and stabilizer.

31. The method of claim 19, wherein the blend composition is formed by extrusion blending.

32. The method of claim 19, further comprising forming a molded part from the formed blend composition.

33. The method of claim 32, further comprising subjecting the molded part to a laser direct structuring process.

* * * * *